(12) United States Patent
Matsuno et al.

(10) Patent No.: US 6,219,609 B1
(45) Date of Patent: Apr. 17, 2001

(54) VEHICLE DYNAMIC CONTROL SYSTEM

(75) Inventors: Koji Matsuno; Munenori Matsuura; Toshihiro Konno; Akira Takahashi; Atsushi Mine, all of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/174,538

(22) Filed: Oct. 19, 1998

(30) Foreign Application Priority Data

Oct. 21, 1997 (JP) .................................................. 9-288785

(51) Int. Cl.[7] ............................................................ B60T 8/00
(52) U.S. Cl. .............................. 701/72; 701/41; 701/83; 701/88; 303/140
(58) Field of Search .............................. 701/36, 72, 78, 701/83, 88, 69, 208, 213; 303/140, 146; 348/118, 119

(56) References Cited

U.S. PATENT DOCUMENTS

| | | | |
|---|---|---|---|
| 5,183,131 | * 2/1993 | Naito | 180/233 |
| 5,265,020 | * 11/1993 | Nakayama | 701/36 |
| 5,301,768 | 4/1994 | Ishikawa . | |
| 5,315,295 | 5/1994 | Fujii . | |
| 5,661,650 | * 8/1997 | Sekine et al. | 701/82 |
| 5,685,386 | * 11/1997 | Kondo et al. | 180/76 |
| 5,742,240 | * 4/1998 | Asanuma et al. | 340/995 |
| 5,757,949 | * 5/1998 | Kinoshita et al. | 382/104 |
| 6,067,497 | * 5/2000 | Sekine et al. | 701/93 |
| 6,076,034 | * 6/2000 | Satoh et al. | 701/70 |

FOREIGN PATENT DOCUMENTS

| | | |
|---|---|---|
| 789 225 A1 | * 8/1997 | (EP) . |
| 2-70561 | 3/1990 | (JP) . |

* cited by examiner

*Primary Examiner*—Michael J. Zanelli
(74) *Attorney, Agent, or Firm*—Smith, Gambrell & Russell

(57) ABSTRACT

The present invention provides a vehicle dynamic control system which alters characteristics of respective vehicle movement controllers so that they can function properly against coming and foreseeable running conditions and current running conditions, recognizing beforehand details of an emerging curve on the road to be traveled. The system comprises a vehicle movement control alterant and at least one among vehicle movement controllers, i.e., a brake controller, a left/right wheel differential limiter controller and power distribution controller. When the vehicle is approaching the curve, the vehicle movement control alterant alters characteristics of a braking controller, the left/right wheel differential limiter controller and the power distribution controller to those favorable to turning for driving through a curve appropriately. When the vehicle is approaching the curve end, the alternate alters characteristics of the left/right differential controller to those favorable to stabilizing running so that the vehicle can pass the curve end and go into straight road appropriately.

15 Claims, 9 Drawing Sheets

CASE1

CASE2

CASE3

CASE4

VEHICLE DYNAMIC CONTROL SYSTEM

BACKGROUND OF THE INVENTION

This invention relates to a vehicle dynamic control system, wherein a vehicle movement control device of said system alters the vehicle's control characteristic according to the curvature of a road to be traveled.

Recently developed and put into practical use are several kinds of vehicle movement control devices, e.g., a brake control device which improves a vehicle's running stability by applying braking force to an appropriate wheel considering reaction forces while cornering or the like, a left/right-wheel-differential limiter control device which controls limitation of the differential of the left and right wheels depending on running conditions and a power distribution control device which distributes driving torque to front and rear wheels in predetermined ratios by controlling the differential limitation of a center differential based on running conditions.

For example, Japanese Patent Laid-open No. 70561/1990 disclosed a brake control device which compares an aimed yaw rate with a real yaw rate of a vehicle, judges the vehicle dynamic characteristic as under steering or over steering against the aimed yaw rate, and then applies corrective braking force to an outer wheel when judged as over steering is judged or to an inner wheel when judged as under steering is judged so that the real yaw rate and the aimed yaw rate become equal, thus upgrading the vehicle running stability.

Because the functions of the vehicle movement control devices aforementioned are corrective controls after detection of running conditions which occur presently, i.e., controls to stabilize the vehicle movement that are carried out upon detection of occurrence of unstable runs, they have difficulties in themselves to prevent occurrence of the unstable runs.

Thinking about a case where a driver finds a curved road in front while driving a vehicle equipped with one of the current vehicle movement control devices, all the measures to be taken for engaging the curved road are entrusted to the driver. If the vehicle enters onto the curved road with inappropriate measures taken by the driver, unstable runs occur and the vehicle movement control devices work thereafter, i.e., delaying the control.

SUMMARY OF THE INVENTION

The present invention provides a vehicle dynamic control system which can estimate an emerging curved road beforehand, activates respective vehicle movement control devices and makes them work properly so that engagement of the curved road, including entering into and coming out the curve, can be carried out appropriately.

The present invention provides a vehicle dynamic control system comprising: a position detection means for determining the location of a vehicle; a curve geometry calculating means for acquiring curve data while detecting a curve in front of the vehicle: at least one vehicle movement controlling means for controlling movement of the vehicle: and a vehicle movement control altering means for changing a characteristic of the vehicle movement control means into a characteristic favorable to turning when the vehicle is not yet in a curve and the distance ahead of the vehicle to a curve is within a predetermined value.

Further, the present invention provides a vehicle dynamic control system aforementioned, wherein the vehicle movement control altering means changes the characteristic of the vehicle movement control means into that favorable to stabilizing the vehicle's posture when the vehicle runs in a curve and the distance ahead of the vehicle to the curve end is within a predetermined value, while changing the characteristic of the vehicle movement control means into that favorable to turning when the vehicle runs in a curve and the distance ahead of the vehicle to the curve end exceeds the predetermined value.

Furthermore, the present invention provides a vehicle dynamic control system aforementioned, wherein the vehicle movement controlling means is at least one among a brake controller applying braking force to a selected wheel based on vehicle running conditions, a left/right-wheel-differential limiter controller controlling limitation of the differential of left and right wheels based on vehicle running conditions and a power distribution controller distributing driving torque to front and rear wheels in predetermined ratios by controlling the differential limitation of a center differential based on vehicle running conditions.

Furthermore, the present invention provides a vehicle dynamic control system aforementioned, wherein the vehicle movement controlling means is the brake controller, and changing of the characteristic of the vehicle movement controlling means to that favorable to turning is done by altering a control parameter specifying sensitivity.

Furthermore, the present invention provides a vehicle dynamic control system aforementioned, wherein the vehicle movement controlling means is the left/right-wheel-differential limiter controller, and changing of the characteristic of the vehicle movement controlling means to that favorable to turning is done by weakening the limitation of the differential of the left and right wheels and vice versa, i.e., changing the characteristic of the vehicle movement controlling means to that favorable to stabilizing the vehicle's posture is done by strengthening the limitation of the differential of the left and right wheels.

Furthermore, the present invention provides a vehicle dynamic control system aforementioned, wherein the vehicle movement controlling means is the power distribution controller for controlling the differential limitation of a center differential, and changing of the characteristic of the vehicle movement controlling means to that favorable to turning is performed by controlling the limitation of the differential to an uneven torque distribution to the front and rear wheels, either the front bigger or the front smaller, while changing the characteristic of the vehicle movement controlling means to that favorable to stabilizing vehicle posture is done by controlling the limitation of the differential to even torque distribution.

DETAILED DESCRIPTION OF THE PREFERRED EMBODIMENT

Figure 1:
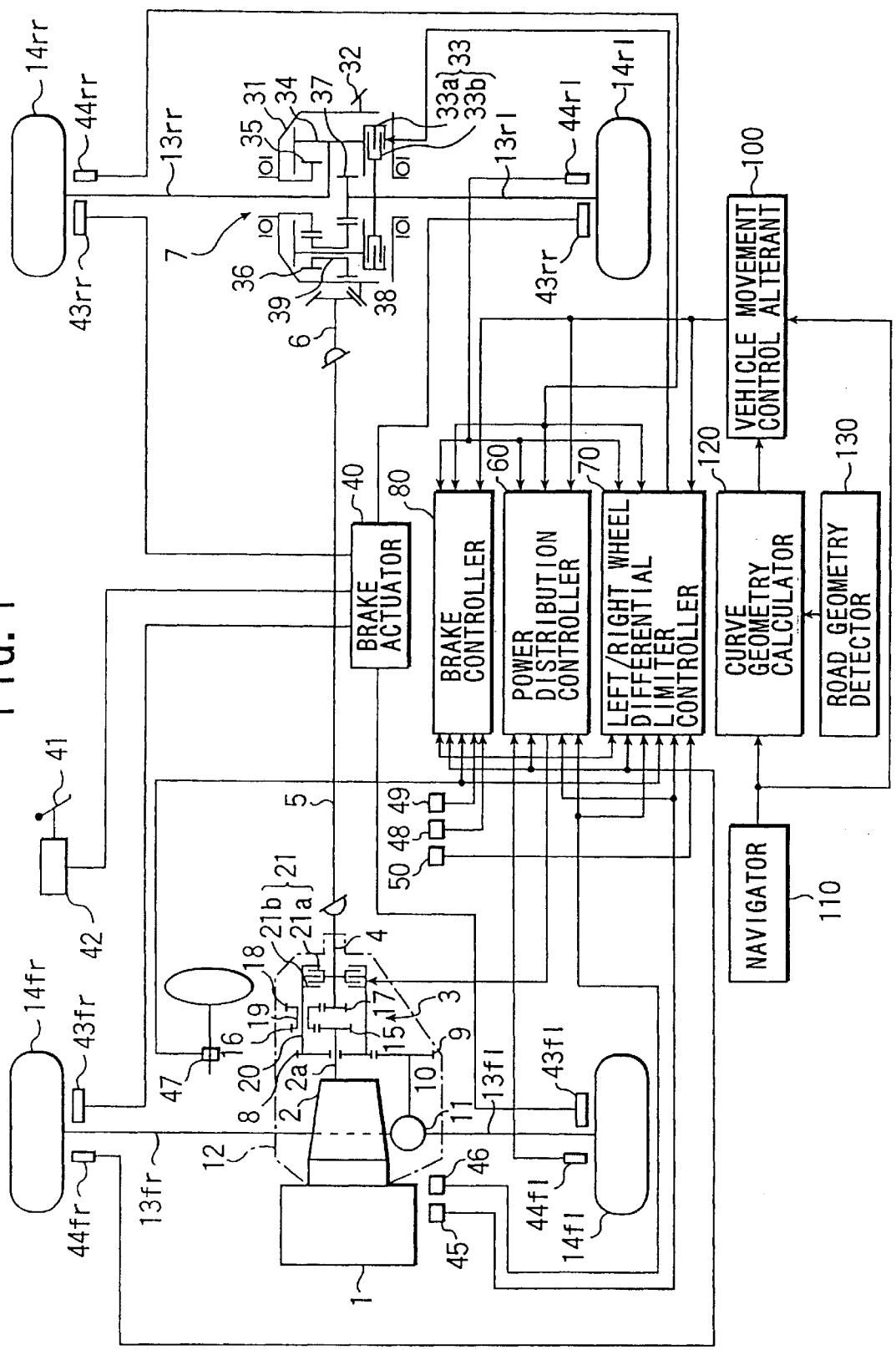
FIG. 1 is an illustration showing an overall configuration of a vehicle dynamic control system according to the present invention.

Referring to FIG. 1, a driving force, generated by an engine 1 installed in front of a vehicle is transmitted to a torque converter and an automatic gear train 2 located next to the engine 1, and transmitted further to a center differential 3 through an output shaft 2a.

The driving force is delivered to a rear differential 7 through a rear drive shaft 4, a propeller shaft 5 and a drive pinion 6, in order, and also delivered to a front differential 11 through a transfer drive gear 8, a transfer driven gear 9 and a front drive shaft 10 of which part forms the drive pinion shaft. The torque converter and automatic gear train 2, the center differential 3 and the front differential 11 and so on are integrally accommodated in a case 12.

The driving force input to the rear differential 7 is transmitted to a left rear wheel 14rl through a left rear drive shaft 13rl and also transmitted to a right rear wheel 14rr through a right rear drive shaft 13rr. The driving force input to the front differential 11 is transmitted to a left front wheel 14fl through a left front drive shaft 13fl and also transmitted to a right front wheel 14fr through a right front drive shaft 13fr.

The center differential 3 comprises the first and the second gear trains. A first sun gear 15 having a relatively large diameter engages with a plurality of first pinions 16 having a relatively small diameter each, forming the first gear train. The first sun gear 15 is formed on the output shaft 2a transmitting the driving force into the center differential 3. A second sun gear 17 having a relatively small diameter engages with a plurality of second pinions 18 having a relatively large diameter each, forming the second gear train. The second sun gear 17 is formed on the rear drive shaft 4 transmitting the driving force to the rear wheels.

The first pinion 16 and the second pinion 18 are formed on a pinion member 19 in unit. A plurality of the pinion members 19, e.g., 3 (three), are rotatably supported by fixed shafts of a carrier 20.

The front end of the carrier 20 is connected to the transfer drive gear 8, transmitting the driving force to the front wheels.

Installed rotatably in the carrier 20 from the front side is the output shaft 2a and installed rotatably from the back side is the rear drive shaft 4. Thus the carrier 20 accommodates the first sun gear 15 and the second sun gear 17 in its center part, the first sun gear and the second sun gear engaging with a plurality of the first and the second pinions 16 and 18 of pinion members 19 respectively.

Thus a compound type planetary gear without a ring gear is formed. The first sun gear 15(input) engaging the first pinions 16 distributes the driving force to one output through the second pinions 18 and the second sun gear 17 and to the other output through the pinion members 19 and the carrier 20.

The center differential 3 of such a compound type planetary gear is capable of setting its torque distribution ratio to a desirable value by appropriately setting intermeshing pitch circle diameters of the first and second pinions 16 and 18 and the first and second sun gears 15 and 17 respectively.

Two output members of the center differential 3, i.e., the carrier 20 and the sun gear 17 are indirectly connected by a transfer clutch 21 which is a hydraulic multi-plate clutch with variable transfer capacity controlled by a power distribution controller 60.

The transfer clutch 21 consists of a plurality of driven plates 21a installed on the rear drive shaft 3 having the second sun gear 17 in a unit and a plurality of drive plates 21b installed to the carrier 20, while the driven plates 21a and the drive plates 21b are alternately positioned. The transfer clutch 21 is pressed or released by a piston (not shown) and a pressure plate (not shown) which are installed on the case 12 and operated by hydraulic pressure in a hydraulic pressure chamber (not shown) hydraulically connected to a hydraulic device (not shown) controlled by the power distribution controller 60.

When the transfer clutch 21 is open, the driving force is distributed in the specified ratio as set by the center differential 3. When the transfer clutch is completely engaged, the differential function becomes inoperative, i.e., directly coupled so that the specified distribution ratio is canceled.

Pressing force, i.e., transfer torque applied to the transfer clutch 21, is controlled by the power distribution controller 60 so that the torque distribution ratio can vary from the ratio specified by the center differential, e.g., front 35/rear 65 to the ratio when directly coupled, e.g., front 50/rear 50. Thus torque distribution control, i.e. power distribution control, is established.

The rear differential 7 has the same compound type planetary gear as the center differential 3. The driving force is transmitted to a differential case 31 through the drive pinion 6 and a crown gear 32 provided on a periphery of the differential case 31 supported rotatably.

The differential case 31 accommodates a carrier 34 supported rotatably, which is cylindrical so that the left side thereof forms a clutch drum 33a. Inserted into the carrier 34 and coupled thereto is the right rear drive shaft 13rr.

A first sun gear 35 having relatively large diameter is provided in the differential case 31 and coupled thereto, engaging with a plurality of first pinions 36 having a relatively small diameter each, forming the first gear train.

Further provided in the differential case 31 is a second sun gear 37 having a relatively small diameter and formed on the end of the left rear drive shaft 13rl inserted into the differential case 31. The second sun gear 37 engages a plurality of second pinions 38 having a relatively large diameter each, forming the second gear train.

The first pinions 36 and the second pinions 38 are formed on pinion members 39 in unit. A plurality of the pinion members 39, e.g., 3 (three), are supported rotatably by fixed shafts of a carrier 34.

The compound type planetary gear has a differential function by appropriately setting tooth numbers of the first sun gear 35, the second sun gear 37 and a plurality of the first and second pinions 36 and 38 positioned around the first sun gear 35 and the second sun gear 37.

The compound type planetary gear functions to provide an even torque distribution of left 50/right 50 as a specified torque distribution by appropriately setting the intermeshing pitch circle diameters of the first and second sun gears 35 and 38 and the first and second pinions 36 and 38.

Further, the compound type planetary gear has a differential limiter function in itself by creating a differential limiting torque in proportion to the strength of the input torque due to two kinds of friction force between the pinion members 39 and the carrier 34. One is friction torque that occurs at the edges of pinion members 39 due to residual thrust force, which is a result of counter balancing of respective thrust forces occurring on the first gear train and the second gear train by making the first sun gear 35/pinions 36 and the second sun gears 35/pinions 38 in such configurations that the gears generate opposite and different thrust forces, for example helical gears with different helix angles for the first gear train and the second gear train respectively. The other is friction torque that occurs at the axis hole of pinion members 39 due to the pressing force against the fixed shaft of the carrier 34 by the composite force of repulsive and tangential forces caused by engagements of the first and second sun gears 35 and 37 and the first and second pinions 36 and 38.

A clutch hub 33b is provided on the left rear drive shaft 13rl at a part thereof positionally corresponding to the clutch drum 33a of the carrier 34. A plurality of drive plates and a plurality of driven plates are installed onto the clutch drum 33a and the clutch hub 33b respectively and alternately position in order, forming a hydraulic multi-plate clutch 33.

The hydraulic multi-plate transfer clutch 33 is pressed or released by a piston (not shown) and a pressure plate (not shown) operated by hydraulic pressure in a hydraulic pressure chamber (not shown) hydraulically connected to a hydraulic device (not shown) controlled by the left/right wheel differential limiter controller 70.

The rear differential 7 comprises a compound-type-planetary-gear-limited-slip-differential which distributes the driving force introduced by the drive pinion 6 to the left rear drive shaft 13rf through the crown gear 32, the differential case 31, the first sun gear 35 and the second sun gear 37, and to the right rear drive shaft 13rr through the carrier 34, further comprising the hydraulic multi-plate clutch 33 which gives variably controlled friction force between one output, i.e., the left rear drive shaft 13rl and the other output, i.e., the carrier 34.

An optimum differential limiting torque is obtained by combination of the differential limiting torque created in the compound-type-planetary-gear-limited-slip-differential in proportion and the additional differential limiting torque created by the hydraulic multi-plate clutch 33 as necessary.

Accordingly, when the hydraulic multi-plate clutch is released by the left/right wheel differential limiter controller 70, the differential function is carried out smoothly with the specified torque distribution, i.e., left 50/right 50, and when the hydraulic multi-plate clutch is engaged, the differential between the left and right wheels is limited and wheel slip is prevented, resulting in a rather stabilized running characteristic.

A brake actuator 40 is hydraulically connected to a master cylinder 42 connected to a brake pedal 41 which is operated by a driver. When the driver operates the brake pedal 41, the master cylinder 42 pressurizes brake fluid and the brake actuator 40 delivers brake pressure to each of 4 wheel cylinders, i.e., a front left wheel cylinder 43fl, a front right wheel cylinder 43fr, a rear left wheel cylinder 43rl and a rear right wheel cylinder 43rr of 4 wheels 14fl, 14fr, 14rl and 14rr through the brake actuator 40 so that braking forces are applied to the 4 wheels.

The brake actuator 40, a hydraulic unit comprising a pressurizing device, a reducing valve and intensifier, can apply brake pressure to the wheel cylinders 43fl, 43fr, 43rl and 43rr respectively, independently and controllably corresponding to input signals.

The wheels 14fl, 14fr, 14rl and 14rr provide a front left wheel speed sensor 44fl, a front right wheel speed sensor 44fr, a rear left wheel speed sensor 44rl and a rear right wheel speed sensor 44rr, respectively, so that each wheel speed is determined. The wheel speed signals are input to the power distribution controller 60, the left/right wheel differential limiter controller 70 and the brake controller 80 which are vehicle movement control means.

A throttle opening sensor 45, a gear position sensor 46, a steering wheel sensor 47, a yaw rate sensor 48, a lateral acceleration sensor 49 and a longitudinal acceleration sensor 50 are provided and send signals respectively. Signals from the throttle opening sensor 45 and the gear position sensor are input to the power distribution controller 60 and the left/right wheel differential limiter controller 70, signals from the steering wheel sensor 47 are input to the left/right wheel differential limiter controller 70 and the brake controller 80, signals from the yaw rate sensor 48 and the lateral acceleration sensor 49 are input to the brake controller 80 and the signals from the longitudinal acceleration sensor 50 are input to the left/right wheel differential limiter controller 70.

Figure 4:
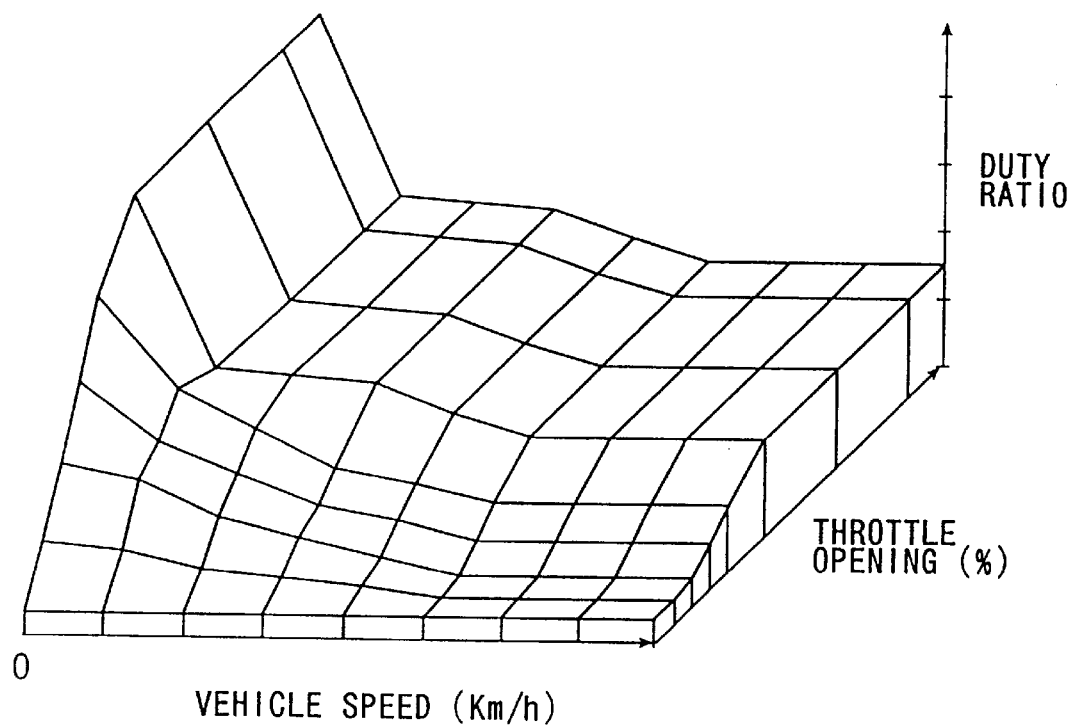
FIG. 4 is an illustration showing an example of a characteristic of a differential limitation torque of a center differential.

The power distribution controller 60 controls the transfer clutch 21. As shown in FIG. 4, application of the differential limiting force to the center differential 3 is basically controlled by referring to a table map of predetermined duty ratios determined by variables of throttle opening θth and vehicle speed V in different control modes, i.e., a normal control mode, a starting control mode, a steering control mode, a slip control mode or the like.

In the normal control mode, five kinds of the table maps mentioned above are prepared as the normal control references corresponding to the $1^{st}$ through $4^{th}$ and reverse gears, which represent a characteristic to make the differential limiting torque lower, the smaller the throttle opening is and the higher the vehicle speed rises. Accordingly, the differential limiting torque is controlled so as to improve turning performance and fuel economy.

In the starting control mode, the differential limiting torque is controlled in proportion to the throttle opening θth when the vehicle speed is 0 km/h and steering is straight on, in order to ensure easy and smooth starting on a low friction road.

In the steering control mode, the differential limiting torque is reduced from that specified for the normal control mode depending on the rotational ratio (NR/NF) of the front and rear wheels in a specified vehicle speed range, in order to improve the feeling of steering in a low speed range. NR is the number of rear wheel rotations and NF is the number of front wheel rotations.

In the slip control mode, the differential limiting torque is controlled in a higher level than specified for the normal control mode when the rear wheel or the front wheel slips more than specified, in order to secure the maximum driving force and increase running stability.

The power distribution controller 60 receives control signals from a vehicle movement control alterant 100 (to be mentioned later) so that the increasing/reducing control of the differential limiting force to the center differential 3 is carried out in response to control signals from the vehicle movement control alterant 100.

The left/right wheel differential limiter control 70 controls the hydraulic multi-plate clutch 33. The rotational speed difference of the 2 rear wheels is calculated from the number of rotations of the rear left and right wheels. When the rear wheel rotation speed difference is bigger than a predetermined value, it is judged that the rear wheels are slipping. When the rear wheel rotation speed difference is smaller than a predetermined value, it is judged that the rear wheels are not slipping.

In case of slipping, the hydraulic multi-plate clutch is controlled with a corrective pressure, referring to a predetermined map established by experiments and theoretical calculations according to the steering wheel angle θf.

In case of non-slipping, the hydraulic multi-plate clutch is controlled with a corrective pressure for non-slipping condition. The corrective pressure for non-slipping condition is determined referring a map according to the variables of vehicle speed, e.g., an average of the 4 wheel speeds, and throttle opening θth. The pressure is also corrected when the gear position i is lower than specified and is further corrected by a longitudinal acceleration.

The map predetermined by experiments and theoretical calculations represents the characteristic that the pressure becomes higher in high speed and high load area.

When the hydraulic controls are carried out in the condition of slipping or non-slipping after judgement of the left/right wheel differential limiter controller 70, the hydraulic device (not shown) works and activates the hydraulic multi-plate clutch 33.

The left/right wheel limiter controller 70 receives control signals from the vehicle movement control alterant 100 so that the control of the hydraulic multi-plate clutch 33 is carried out in response to instructions from the vehicle movement control alterant 100.

The brake controller 80, e.g., a brake controller disclosed per Japanese Patent Laid-open No. 76894/1997 by this applicant, controls the application of a braking force to a selected wheel according to vehicle running conditions.

Figure 2:
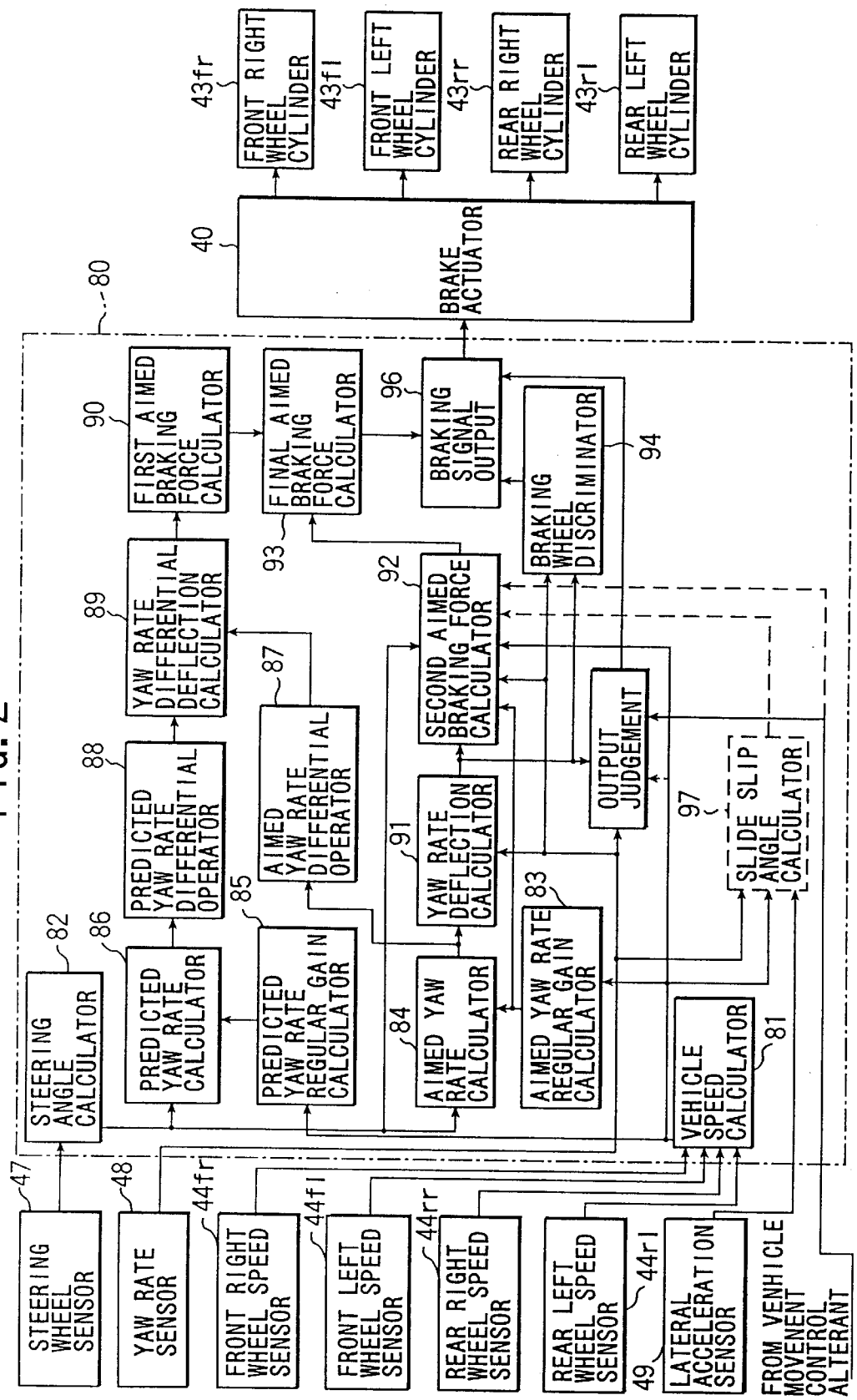
FIG. 2 is a block diagram showing a configuration of a brake controller.

Referring to FIG. 2, the brake controller 80 comprises a vehicle speed calculator 81, a steering angle calculator 82, an aimed yaw rate regular gain calculator 83, an aimed yaw rate calculator 84, a predicted yaw rate regular gain calculator 85, a predicted yaw rate calculator 86, an aimed yaw rate differential operator 87, a predicted yaw rate differential operator 88, a yaw rate differential deflection calculator 89, a first aimed braking force calculator 90, a yaw rate deflection calculator 91, a second aimed braking force calculator 92, a final aimed braking force calculator 93, a braking wheel discriminator 94, an output judgment 95 and a braking signal output 96.

The vehicle speed calculator 81 receives wheel speed signals from the wheel speed sensors 44fl, 44fr, 44rl and 44rr, determines the vehicle speed V by calculation with a given formula, for example calculating an average of wheel speeds obtained from the wheel speed sensors 44fl, 44fr, 44rl and 44rr, and sends a signal representative of the vehicle speed V to the aimed yaw rate regular gain calculator 83, the predicted yaw rate regular gain calculator 85 and the second aimed braking force calculator 92.

The steering angle calculator 82 receives a signal from the steering wheel sensor 47, calculates a real steering angle δf by dividing the steering wheel angle θf by the steering gear ratio N (δf=θf/N), and sends the signal representative of the real steering angle δf to the aimed yaw rate calculator 84, the predicted yaw rate calculator 86 and the second aimed braking force calculator 92.

The aimed yaw rate regular gain calculator 83 determines a yaw rate value, i.e., the aimed yaw rate regular gain Gγδf(0), corresponding to the real steering angle δf while turning along a constant circle by a predetermined formula, and sends the calculated aimed yaw rate regular gain Gγδf(0) to the aimed yaw rate calculator 84 and the second aimed braking force calculator 92. The aimed yaw rate regular gain Gγδf(0) is determined by the following formula;

$$G\gamma\delta f(0)=1/(1+A\circ\times V^2)\times V/L \tag{1}$$

wherein L is the wheel base and A∘ is the stability factor calculated from vehicle specifications by the following formula;

$$A\circ=(-m\times(Lf\times CPf-Lr\times CPr)/(2\times L^2\times CPf\times CPr) \tag{2}$$

wherein, m is the vehicle mass, Lf is the distance from the front wheel axis to the center of gravity of the vehicle, Lr is the distance from the rear wheel axis to the center of gravity of the vehicle, CPf is the front equivalent cornering power and CPr is the rear equivalent cornering power.

The aimed yaw rate calculator 84 calculates an aimed yaw rate γ' based on the real steering angle δf received from the steering angle calculator 82 and the aimed yaw rate regular gain Gγδf(0) received from the aimed yaw rate regular gain calculator 83, counting response delay of the vehicle movement, and sends a signal representative of the aimed yaw rate γ' to the aimed yaw rate differential operator 87 and to the yaw rate deflection calculator 91.

The aimed yaw rate γ' is calculated by the following formula;

$$\gamma'=1/(1+T\cdot s)\times G\gamma\delta f(0)\times\delta f \tag{3}$$

wherein T is a time constant and s is Laplace operator. The above formula (3) includes the response delay of the vehicle movement expressed by the $1^{st}$ approximation, which is given in the $2^{nd}$ order otherwise. And the time constant T is determined, for example by the following formula;

$$T=m\times Lf\times V/2\times L\times CPr \tag{4}$$

The predicted yaw rate regular gain calculator 85 determines a predicted yaw rate regular gain Gγδf(0)LOW which is a predicted yaw rate value when the vehicle turns along a constant circle with a real steering angle δf on a low friction road surface. The calculated predicted yaw rate regular gain Gγδf(0)LOW is sent to the predicted yaw rate calculator 86. The predicted yaw rate regular gain Gγδf(0)LOW is given by the following formula;

$$G\gamma\delta f(0)LOW=1/(1+A\circ LOW\times V^2)\times V/L \tag{5}$$

wherein $A\Omega LOW$ is a stability factor for running on a low friction road determined by the vehicle specification and given by the following formula;

$$A_0LOW = (-m \times (Lf \times CPfLOW - Lr \times CPrLOW))/ \qquad (6)$$
$$(2 \times L^2 \times CPfLOW \times CPrLOW)$$

wherein CPfLOW is a front equivalent cornering power on a low friction road and CPrLOW is a rear equivalent cornering power on a low friction road.

The predicted yaw rate calculator 86 calculates a predicted yaw rate for a low friction road γ'LOW based on the real steering angle δf received from the steering angle calculator 82 and the predicted yaw rate regular gain Gγδf(0)LOW received from the predicted yaw rate regular gain calculator 85, counting the response delay of the vehicle movement, and sends a signal representative of the predicted yaw rate γ'LOW to the predicted yaw rate differential operator 88. The predicted yaw rate for a low friction road γ'LOW is determined by the following formula;

$$\gamma'LOW = 1/(1+TLOW \cdot s) \times G\gamma\delta f(0)LOW \times \delta f \qquad (7)$$

wherein TLOW is a time constant. The above formula (7) includes the response delay of the vehicle movement expressed by the $1^{st}$ approximation, which is given in the $2^{nd}$ order otherwise. And the time constant TLOW is determined, for example by the following formula;

$$TLOW = m \times Lf \times V/2 \times L \times CPrLOW \qquad (8)$$

The aimed yaw rate differential operator 87 calculates an aimed yaw rate differential Sγ' which is a differential value of the aimed yaw rate γ' determined by the aimed yaw rate calculator 84, and the predicted yaw rate differential operator 88 calculates a predicted yaw rate differential Sγ'LOW which is a differential value of the predicted yaw rate Sγ'LOW determined by the predicted yaw rate calculator 86.

The aimed yaw rate differential Sγ' calculated by the aimed yaw rate differential operator 87 and the predicted yaw rate differential Sγ'LOW calculated by the predicted yaw rate differential operator 88 are sent to the yaw rate differential deflection calculator 89. And the yaw rate differential deflection calculator 89 calculates a yaw rate differential deflection dΔγ which is a deflection of the aimed yaw rate differential Sγ' and the predicted yaw rate differential Sγ'LOW, according to the following formula;

$$d\Delta\gamma = S\gamma'LOW - S\gamma' \qquad (9)$$

The first aimed braking force calculator 90 receives the yaw rate differential deflection dΔγ from the yaw rate differential deflection calculator 89 and calculates aimed braking forces for the front and rear wheels, i.e., a first front wheel aimed pressure BF1f and a first rear wheel aimed pressure BF1r. The calculated results of the first front wheel aimed pressure BF1f and the first rear wheel aimed pressure BF1r are sent to the final aimed braking force calculator 93. The first front wheel aimed pressure BF1f and the first rear wheel aimed pressure BF1r are determined by the following formulas;

$$BF1f = G1 \times d\Delta\gamma \times Iz/(df/2) \qquad (10)$$

$$BF1r = G1 \times G2 \times d\Delta\gamma \times Iz/(dr/2) \qquad (11)$$

wherein G1 and G2 are gains (e.g., 0.05 and 0.15 respectively), Iz is yaw inertia moment oh the vehicle, df is the front tread and dr is the rear tread. In the formula (10), G1 is the first large gain and $d\Delta\gamma \times Iz/(df/2)$ is a part showing the first theoretical braking force for the front wheels. In the formula (11), G1×G2 is the first small gain and $d\Delta\gamma \times Iz/(dr/2)$ is a part showing the first theoretical braking force for the rear wheels. In order to prevent losing stability caused by side slips occurring at a rear wheel or to prevent a feeling of unstableness given by unexpectedly strong turning moment occurring when the rear wheels are braked, especially on a low friction road, the first rear wheel aimed pressure BF1r is made smaller by multiplying the first theoretical braking force for the rear wheels by the first small gain.

As described above, the first aimed pressures BF1f and Bf1r derived based on the yaw rate differential deflection dΔγ are values which are calculated supposing that the vehicle runs on a low friction road. The reason for supposing low friction road running is that the more brake controlling is needed, the lower the road friction is. The respective specified values applicable for a low friction road have been determined from data obtained by experiments using vehicle models or by well known theoretical calculations.

The yaw rate deflection calculator 91 determines a yaw rate deflection Δγ(=γ−γ'), subtracting the aimed yaw rate γ' calculated by the aimed yaw rate calculator 84 from a real yaw rate γ detected by the yaw rate sensor 48. The yaw rate deflection Δγ is sent to the second aimed braking force calculator 92 and the braking wheel discriminator 94.

The second aimed braking force calculator 92 calculates aimed braking forces for the front and rear wheels, i.e., a second front wheel aimed pressure BF2f and a second rear wheel aimed pressure BF2r. The second aimed pressures BF2f and BF2r thus calculated are sent to the final aimed braking force calculator 93. The second aimed pressures BF2f and BF2r are determined by the following formulas;

$$BF2f = G3 \times (\Delta A \times 4 \times L^2 \times CPf \times CPr \times V)/ \qquad (12)$$
$$((CPf + CPr)/df) \times \gamma$$

$$BF2r = G3 \times G4 \times (\Delta A \times 4 \times L^2 \times CPf \times CPr \times V)/ \qquad (13)$$
$$((CPf + CPr)/dr) \times \gamma$$

wherein G3 (e.g., 8.0) and G4 (e.g., 0.15) are gains and ΔA is determined by the following formula;

$$\Delta A = (\delta f/(G\gamma\delta f(0) \times \delta f + \Delta\gamma) - 1/G\gamma\delta f(0))/(L \times V) \qquad (14)$$

In the above formula (14), Δγ may be further corrected considering a side slip angle α which is determined by the vehicle proceeding direction and the vehicle longitudinal axis. To be more concrete, a side slip angle calculator 97 indicated with broken lines in FIG. 2 determines the side slip angle α and the second aimed braking force calculator 92 calculates a yaw rate deflection correcting value Δγ' corresponding to the side slip angle ∂ by substituting Δγ+Δγ' in lieu of Δγ in the formula (14), i.e., $$\Delta A = (\delta f/(G\gamma\delta f(0) \times \delta f + (\Delta\gamma + \Delta\gamma')) - 1/G\gamma\delta f(0))/(L \times V) \qquad (14)$$

The side slip angle calculator 97 determines the side slip angle α by, for example, such calculation that a side slip angle differential dβ is obtained based on a lateral acceleration Gy, the vehicle speed V and the yaw rate γ and then the side slip angle differential dβ is integrated (Integral: β).

Figure 5:
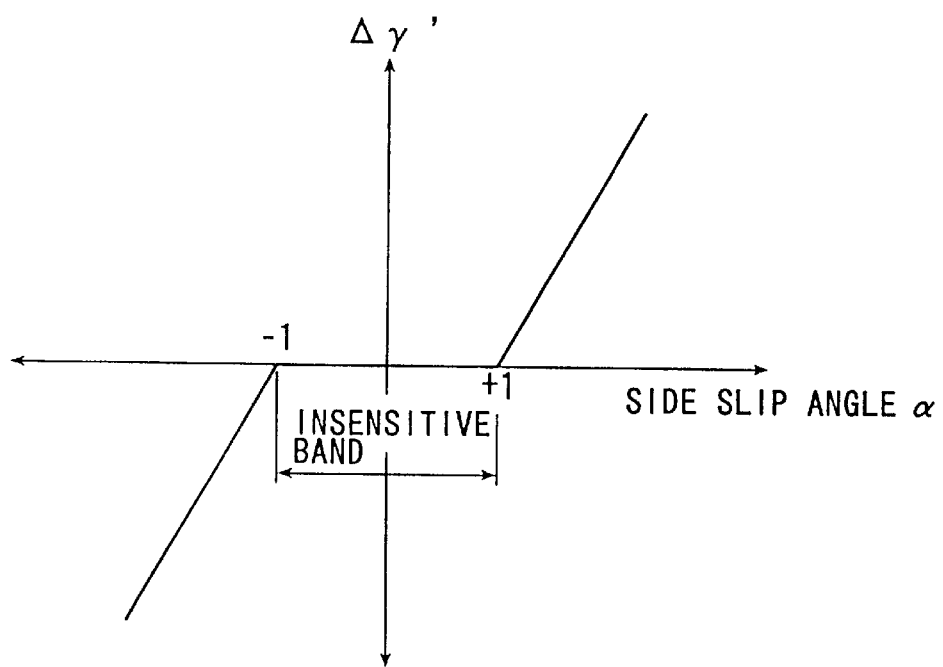
FIG. 5 is an illustration showing an example of a yaw rate deflection correcting value Δγ' versus a side slip angle α.

The yaw rate deflection correcting value Δγ' corresponding to the side slip angle α is given as shown on FIG. 5, wherein an insensitivity band, for example, is provided where the yaw rate deflection correcting value Δγ is equal to 0 in a band where the side slip angle ∂ varies from −1 to +1.

And the second aimed braking force calculator 92 is so arranged to receive signals from the vehicle movement control alterant 100 that the brake controlling characteristic is alterable to become sensitive according to a control instruction from the vehicle movement control alterant 100 to make the insensitivity band of the side slip angle α narrow.

The above mentioned G3 and G4 are gains which are set with same reason as G1 and G2 previously mentioned. In the formula (12), G3 is the second large gain and the other part represents the second theoretical braking force for the front wheels. In the formula (13), G3×G4 is the second small gain and the other represents the second theoretical braking force for the rear wheels. Accordingly the strength of the braking forces to the rear wheels is also repressed according to the formulas (12) and (13). Repression of braking forces applied to the rear wheels is done finely by setting the respective gains of G1 through G4 so that a driver does not feel unusual vehicle movement and running stability is upgraded.

The final aimed braking force calculator 93 determines the final aimed braking forces (i.e., the final aimed pressures, BFf and BFr) by adding the first aimed pressures BF1f, BF1r and the second aimed pressures BF2f, BF2r, respectively. The calculated final aimed pressures BFf and BFr are sent to the braking signal output 96.

$$BFf = BF1f + BF2f \quad (15)$$

$$BFr = BF1r + BF2r \quad (16)$$

This embodiment of the present invention is to improve responsiveness and followability by eliminating control delays by corrections which are made under conditions supposing that the vehicle runs on a low friction load. In the differential operations employed here, because the calculation uses predetermined values of a vehicle model instead of values which are to be calculated from actual yaw rate signals, large enough and precise corrections are available.

Figure 6:
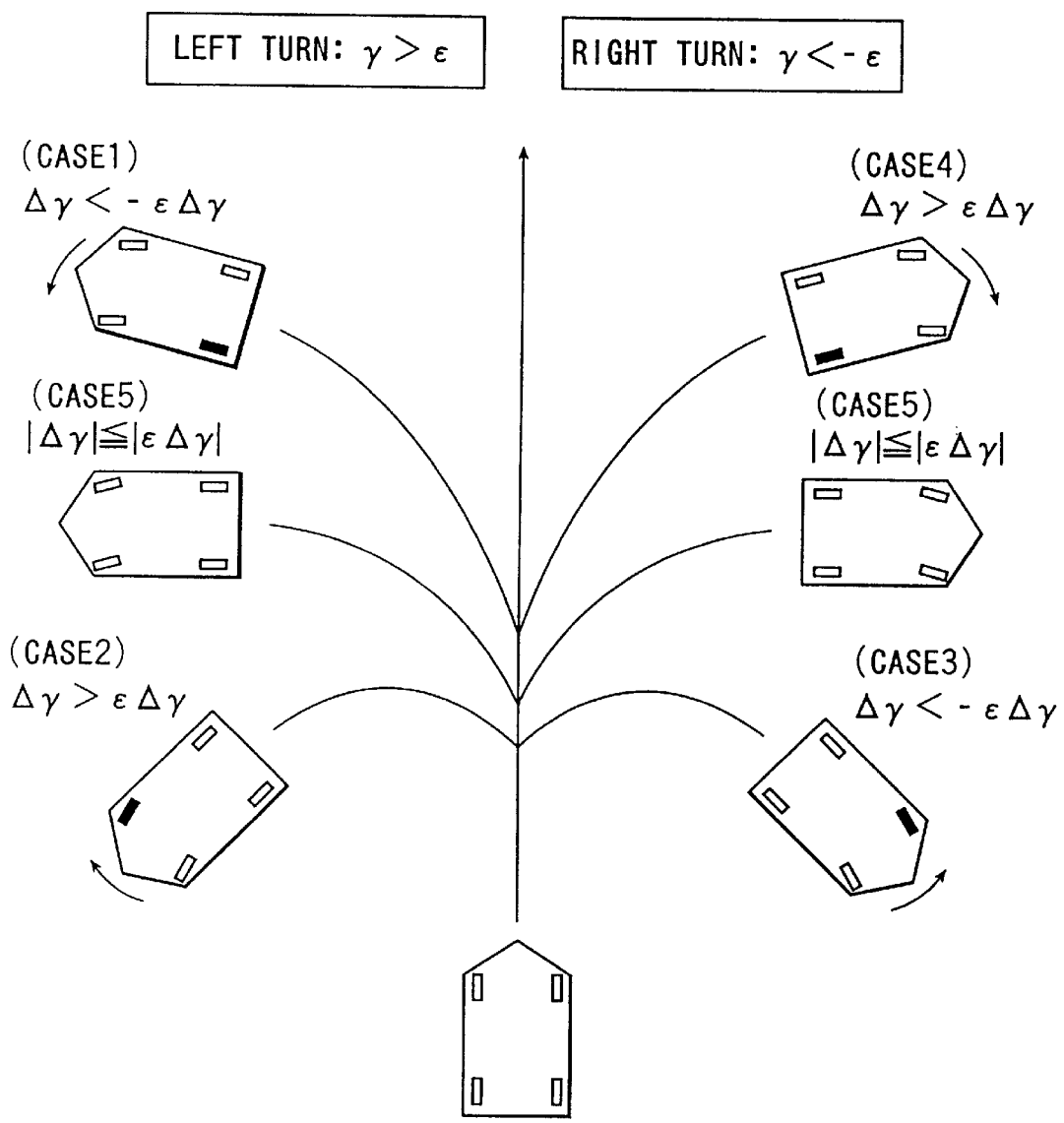
FIG. 6 is an illustration showing vehicle movements according to brake controls.

The braking wheel discriminator 94 selects which wheel is to be applied with braking from combinations of signs of the real yaw rate γ and the yaw rate deflection Δγ. The following combinations are provided. Signs of the real yaw rate γ and the aimed yaw rate γ' are given as (+) plus in a direction of left turning and (−) minus in a direction of right turning. In order to judge a straight running situation, ε, a small and plus figure close to 0, predetermined by experiments or calculation is employed. And, in order to judge that the vehicle is in almost neutral steering condition against the aimed yaw rate γ', εΔγ, a small and plus figure close to 0, predetermined by experiments or calculation is employed. Referring to FIG. 6
(Case 1)

$$\gamma > \epsilon, \Delta\gamma < -\epsilon\Delta\gamma$$

Means under steering against the aimed yaw rate γ' in left tuning. - - - braking of rear left wheel
(Case 2)

$$\gamma > \epsilon, \Delta\gamma > \epsilon\Delta\gamma$$

Means over steering against the aimed yaw rate γ' in left tuning. - - - braking of front right wheel
(Case 3)

$$\gamma < \epsilon, \Delta\gamma < -\epsilon\Delta\gamma$$

Means over steering against the aimed yaw rate γ' in right tuning. - - - braking of front left wheel
(Case 4)

$$\gamma < \epsilon, \Delta\gamma > \epsilon\Delta\gamma$$

Means under steering against the aimed yaw rate γ' in right tuning. - - - braking of rear right wheel
(Case 5)

When the judgment is |γ|<|ε|, i.e., approximately straight or |Δγ|=|εΔγ|, i.e., approximately neutral steering against the aimed yaw rate γ', no selection and no braking are done.

Except the cases of the approximately straight running condition determined by |γ|<|ε| and approximately neutral steering condition against the aimed yaw rate γ' determined by |Δγ|=|εΔγ|, when signs of the real yaw rate γ and the yaw rate deflection Δγ are different, the rear inside wheel is selected as the braking wheel, and when signs of the real yaw rate γ and the yaw rate deflection Δγ are the same, the front outside wheel is selected as the braking wheel. A result of the judgment of the braking wheel discriminator 94 is sent to the braking signal output 96.

The output judgement 95 judges whether the yaw rate deflection Δγ is within a control range or not and sends a result to the braking signal output 96. A judgment threshold εΔ, which is the insensitivity band of control, is provided as mentioned later so that the output judgement 95 compares the judgment threshold εΔ and the yaw rate deflection Δγ and judges whether the yaw rate deflection Δγ is within a control range or not.

The first threshold εΔM is used for the judgment threshold εΔ ordinarily, and the second threshold εΔS supersedes it starting from the time when the vehicle movement characteristic changes from under steering to over steering until a predetermined period ends or until either yaw rate deflection or real yaw rate becomes nearly 0. The first threshold εΔM and the second threshold εΔS are positive values predetermined based on experiments or calculations and the size relation of these thresholds used for judgment on the yaw rate deflection Δγ is as follows;

$$|\epsilon\Delta M| > |\epsilon\Delta S| > |\epsilon\Delta\gamma|$$

Setting at least one of the first threshold εΔM and the second threshold εΔS to be variable, it is possible to provide the judgment threshold εΔ with a more appropriate value corresponding to vehicle speed. It is reasonable to make the non control area larger at a low speed, because corrective operation by a driver is so effective that control is not required when vehicle movement becomes unstable at low speed, compared to the vehicle movement at high speed.

The output judgement 95 receives signals from the vehicle movement control alterant 100. The threshold is set smaller in the output judgement 95 according to an instruction from the vehicle movement control alterant 100 so that control sensitivity is changeable towards a direction where braking control is carried out promptly.

According to the signal from the output judgement 95, the braking signal output 96 arranges that the brake actuator 40 applies the final front wheel aimed pressure BFf or the final rear wheel aimed pressure BFr calculated by the final aimed braking force calculator 93 to a braking wheel selected by the braking wheel discriminator 94.

Figure 3:
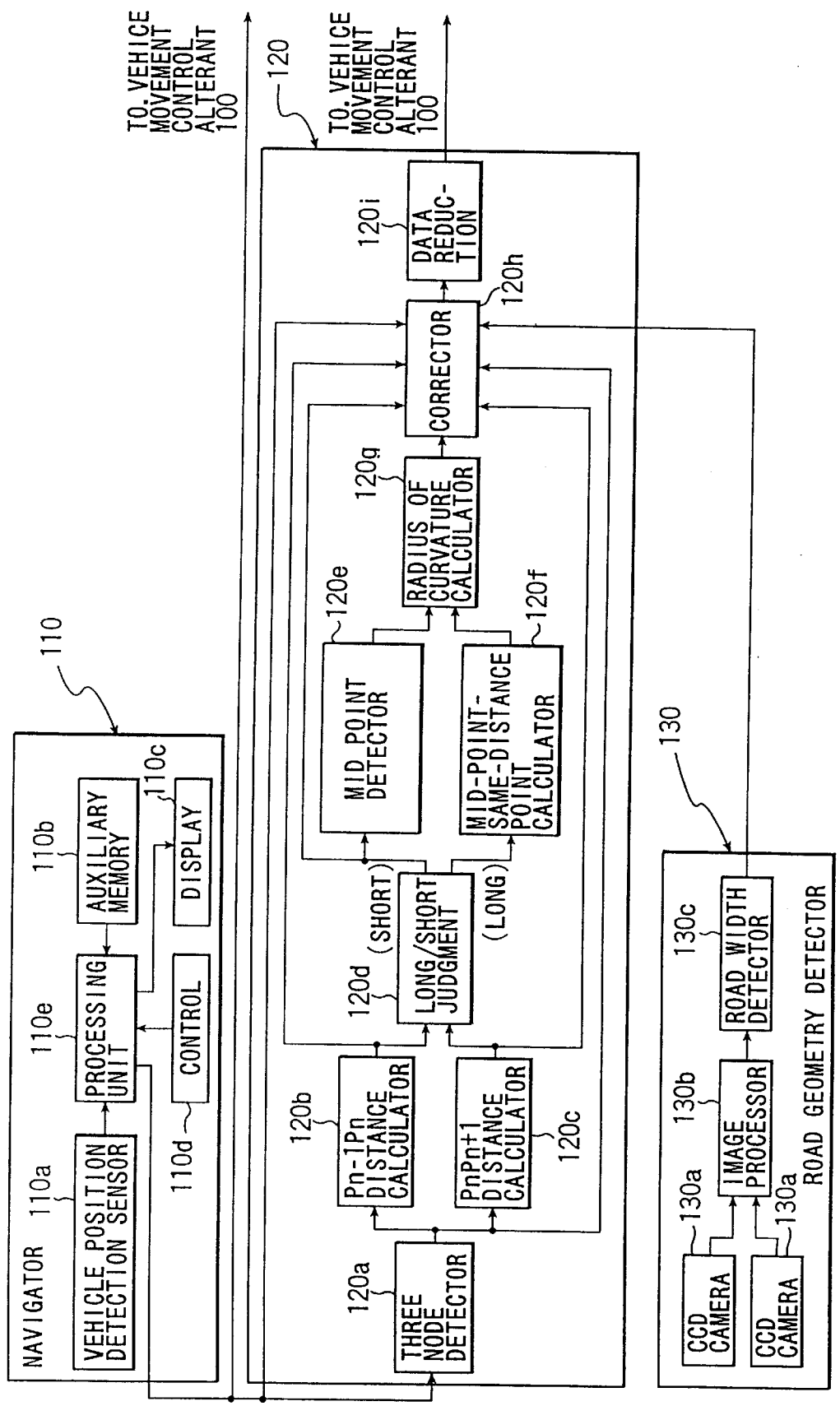
FIG. 3 is an illustration showing construction of an input to a vehicle movement control alterant.

Referring to FIG. 3, the vehicle is equipped with a navigator 110, which is a running position locating means for determining the location of the running vehicle, a road geometry detector 130 and a curve geometry calculator 120, which are curve data creating means for acquiring curve data while detecting the vehicle's position and a curve in front of the vehicle.

In general, as shown in FIG. 3, the navigator 110 consists mainly of a vehicle position detection sensor 110a, an auxiliary memory 110b, a display 110c, a control section 110d, and a processing unit 110e.

The vehicle position detection sensor 110a gathers running information related to the vehicle's position. The sensor 110a consists manly of a GPS (Global Positioning System) receiver to receive positioning signals from GPS satellites so as to determine the position of the vehicle; a magnetic sensor to detect the absolute running direction of the vehicle; and a wheel speed sensor composed of an electromagnetic pickup facing an outer periphery of a rotor fixed to the wheel to output a pulse signal when it crosses projections on the outer periphery of the rotor.

Figure 7:
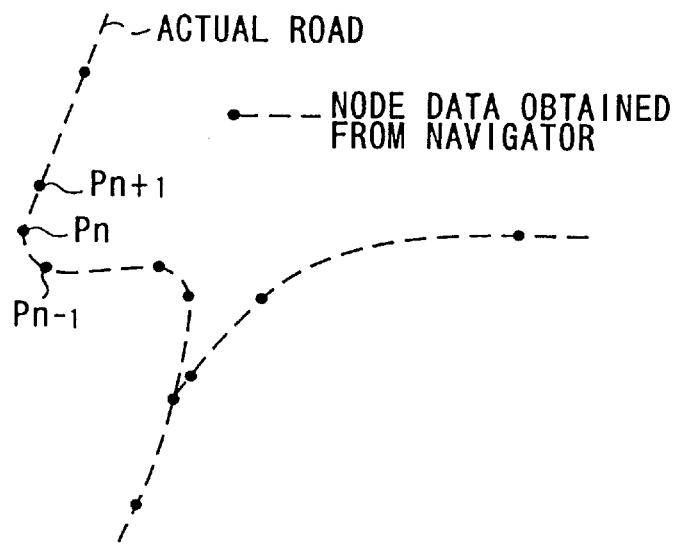
FIG. 7 is an illustration showing examples of node data actually obtained from a navigator.

The auxiliary memory 110b is a CD-ROM device, containing a CD ROM in which road information is stored, topographical information and other road map information. In the CD-ROM, road map information is stored at several hierarchical levels in varying scales as well as road type information for motor ways, ordinary national roads and local roads, and information on passage conditions of intersections. As shown in FIG. 7, the road data included in the road map information consists of point data (nodes) entered at given intervals of space and line data (link) formed by connecting these nodes.

The display 110c is a liquid crystal display which displays maps, the vehicle's position (the latitude, longitude and altitude), orientation, the position of vehicle on the map, and the optimum routing up to the destination. A touch panel as the control section 110d is integrated in the display 110c (liquid crystal display), making it possible to change display of the map scale, detailed display of place names, and displays of area information and route guidance.

The processing unit 110e combines the vehicle running information obtained from the vehicle position detection sensor 110a and the map information read from the auxiliary memory 110b, while making map matching and other processing. The results are fed to the display 110c based on an operating signal sent from the control section 110d, so as to display the present position of the vehicle, its peripheral map, the optimum route to the destination and other information. The node data of the road and the information on road types are sent to the vehicle movement control alterant 100 and the curve geometry detector 120 as required.

According to this embodiment, an important function of the road geometry detector 130 is to detect road width. The detector 130 consists mainly of a pair of CCD cameras 130a, an image processor 130b and a road width detector 130c.

The pair of CCD cameras 130a are installed a fixed distance apart at the right and left sides of the front part of the ceiling in the vehicle compartment, so as to make stereoimages of the objects outside of the vehicle. Signals of the images taken by the CCD cameras 130a are sent to the image processor 130b.

A pair of stereoimages taken by the CCD cameras 130a are fed to the image processor 130b that determines distance data over the entire image field by way of trigonometric calculations according to the deflections of the positions of objects in each respective image, so as to generate a 3D-image showing distances. The generated 3D-image is sent to the road width detector 130c.

The road width detector 130c firstly recognizes the road being traveled on by carrying out a histogram processing of the distance distributions of the 3D-images sent from the image processor 130b. The road width thus calculated is then sent to the curve geometry calculator 120 as required.

The road width detector 130c approximates, for example, lane-dividing lines as broken lines, and judges the area between the left and right broken lines as the traffic lane for the vehicle. The road width is calculated from the distance between the left and right broken lines of the traffic lane. As the road geometry detector 130 detects road geometry to determine the road width, it is possible to obtain more accurate data about positioning of the vehicle by comparing the road geometry detected by the road geometry detector 130 with the road geometry data on the map in the navigator 100, and correcting the vehicle position on the map.

As shown in, e.g., FIG. 3, the curve geometry calculator 120 comprises a three-node detector 120a, a Pn−1 Pn distance calculator 120b, a Pn Pn+1 distance calculator 120c, a long/short judgment section 120d, a mid-point calculator 120e, a mid-point-same-distance point calculator 120f, a radius calculator 120g and a corrector 120h.

As shown in FIG. 7, the three-node detection detector 120a reads three nodes located at given intervals in the traveling direction of the vehicle or on the road selected by the driver, successively (from a node closer to the vehicle) as the first node Pn−1, the second node Pn and the third node Pn+1, from the road nodes input from the navigator 110. Among these read three nodes, the positional information of the first and second nodes Pn−1 and Pn are output to the Pn−1 Pn distance calculator 120b, and the positional information of the second and third nodes Pn and Pn+1 are outputted to the Pn Pn+1 distance calculator 120c. Pn−1, Pn, and Pn+1 are represented by (Xn−1, Yn−1), (Xn, Yn), and (Xn+1, Yn+1), respectively. The representative node of the curve is Pn. Therefore, the curve data at points P1, P2, . . . , and Pn are calculated by the combination of (P0, P1, P2) (P1, P2, P3), . . . , and (Pn−1, Pn, Pn+1), respectively. The Pn—Pn distance calculator 120b calculates a straight distance connecting Pn−1 and Pn based on the positional information of Pn−1 and Pn input from the three-node detector 120a, so as to send the straight distance to the long/shortjudgment 120d and the corrector section 120h.

The Pn Pn+1 distance calculator 120c calculates a straight distance connecting Pn and Pn+1 based on the positional information of Pn and Pn+1 input from the three-node detector 120a, and sends the straight distance to the long/shortjudgment 120d and the corrector 120h.

The long/short judgment 120d compares the straight distance connecting Pn−1 and Pn input from the Pn−1 Pn distance calculator 120b and the straight distance connecting Pn and Pn+1 input from the Pn Pn+1 distance calculator 120c, so as to judge which is shorter. Every data (position, distance) for the shorter straight distance is output to the mid-point calculator 120e and the corrector 120h, while every data (position, distance) for the longer straight distance is output to the mid-point-same-distance point calculator 120f.

In this connection, when the comparison at the long/shortjudgment 120d shows an equal length for both straight distances, that is, when either one can be used, it is previously set so that the straight line connecting Pn−1 and Pn is to be handled as the shorter straight line (or it may be previously set so that the straight line connecting Pn and Pn+1 is to be handled as the shorter straight line).

Based on every data (position, distance) for the shorter straight line input from the long/short judgment 120d, the mid-point calculator 120e not only calculates half of the shorter straight distance, but also determines the mid point position on the shorter straight line. Here, when the shorter straight line is the straight line connecting Pn−1 and Pn, and when the mid-node Pn−1, n is represented as (Xn−1, n, Yn−1, n)

$$Pn-1, n = (Xn-1, n, Yn-1, n)$$
$$= ((Xn-1+Xn)/2, (Yn-1, +Yn)/2)$$

Furthermore, every data calculated by the mid-point calculator 120e is output to the mid-point-same-distance point calculator 120f and the radius calculator 120g.

Based on the data (position, distance) of the longer straight line input from the long/short judgment 120d and the data (half the distance) of the shorter straight line input from the mid-point calculator 120e, the mid-point-same-distance point calculator 120f determines a mid-point-same-distance point at the position at half the distance of the shorter straight line apart from Pn on the longer straight line. Here, let us assume that the longer straight line is the line connecting Pn and Pn+1, and let us represent the mid-point-same-distance point by Pn, n+1 (Xn, n+1, Yn, n+1). Then, $$Pn, n+1 = Pn + PnPn, n+1$$
$$= (Xn, Yn) + K2(Xn+1-Xn, Yn+1-Yn)$$
$$= (Xn, n+1, Yn, n+1)$$

where, $$K2 = ((Xn-Xn-1)^2 + (Xn-Yn-1)^2)^{1/2} / \left(2((Xn+1-Xn)^2 + (Yn+1-Yn)^2)^{1/2}\right)$$

The positional data of the mid-point-same-distance node Pn, n+1 calculated by the mid-point-same-distance point calculator 120f is output to the radius calculator 120g.

Figure 8:
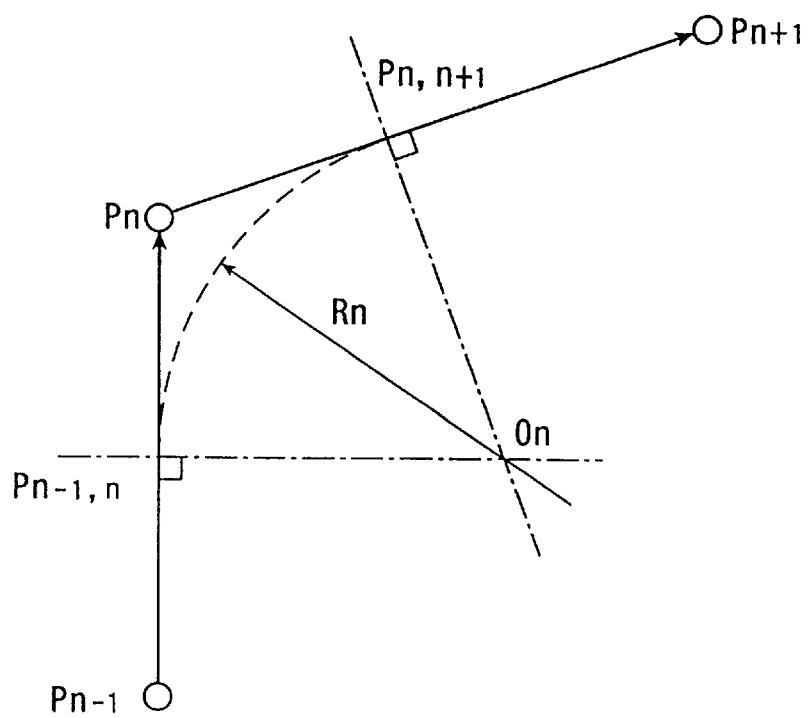
FIG. 8 is an illustration showing how to determine the radius of curvature of an emerging curve.

As shown in FIG. 8, based on the positional data of a mid-node Pn−1, n input from the mid point calculator 120e and the positional data of a mid-point-same-distance node Pn, n+1 calculated by the mid-point-same-distance point calculator 120f, the radius calculator 120g determines as the central position "On" of the emerging curve on the road the intersection of a line that crosses the shorter straight line (here, Pn−1 Pn) at a right angle at the mid-node Pn−1, n, and a line that crosses the longer straight line (here, Pn Pn+1) at a right angle at the mid-point-same-distance node Pn, n+1. Then, based on the determined central position "On" , the radius calculator 120g calculates the radius of curvature Rn of the Curve. The calculation results are output to the corrector 120h.

In other words:

$$On = Pn-1, n + Pn-1, nOn \tag{17}$$
$$= (Xn-1, n, Yn-1, n) + M(Yn-Yn-1, Xn-1-Xn)$$
$$On = Pn, n+1, n+Pn, n+1 On \tag{18}$$
$$= (Xn, n+1, Yn, n+1) + N(Yn+1-Yn, Xn-Xn+1)$$

Therefore, $$Xn-1,n+M(Yn-Yn-1)=Xn,n+1+N(Yn+1-Yn) \tag{19}$$
$$Yn-1,n+M(Xn-1-Xn)=Yn,n+1+N(Xn-Xn+1) \tag{20}$$

Elimination of M from both expressions (19) and (20) can obtain N as shown below:

$$N = ((Xn-1-Xn)(Xn-1, n-Xn, n+1) + \tag{21}$$
$$(Yn-1-Yn)(Yn-1, n-Yn, n+1))/$$
$$(Xn-1 \cdot Yn+1-Xn+1 \cdot Yn-1-Xn-1 \cdot Yn+$$
$$Xn \cdot Yn-1-Xn \cdot Yn+1+Xn+1 \cdot Yn)$$

The position "On" of curve center is:

$$On = (Xon, Yon) \tag{22}$$
$$= (Xn, n+1+N \cdot Yn+1-N \cdot Yn, Yn, n+1+N \cdot Xn-N \cdot Xn+1)$$

Therefore, the radius of curvature Rn is obtained from the following expression (23):

$$Rn = ((Xn-Xn-1)(Yn+1-Yn)-(Xn+1-Xn)(Yn-Yn-1))/ \tag{23}$$
$$|((Xn-Xn-1)(Yn+1-Yn)-(Xn+1-Xn)(Yn-Yn-1))| \cdot$$
$$((Xon-Xn-1, n)^2 + (Yon-Yn-1, n)^2)^{1/2}$$

Here, the case when the radius of curvature Rn is positive means a left turn and the case when the radius of curvature Rn is negative means a right turn.

The distance Lon from the center of the curve On to the representative node of the curve, i.e., the second node Pn is obtained from the following expression (24):

$$Lon=((Xon-Xn)^2+(Yon-Yn)^2)^{1/2} \tag{24}$$

The corrector 120h calculates the difference De1n between the radius of curvature Rn obtained by the radius calculator 120g and the distance Lon from the curve center position On to the second node Pn. When the difference De1n exceeds a given error value (to be described later), the corrector 120h corrects the radius of curvature Rn so that the difference De1n be within the given error value.

Final curve information for each node, which has been corrected by the corrector 120h or left intact because of the difference De1n being smaller than the given error set value, is output to the data reduction section 120i for storage and subsequent processing. Here, the final curve information for each node includes the position (Xn, Yn) of the representative node Pn of a curve; the distance Ln between node Pn−1 and node Pn; final radius of curvature Rn; curve angles θn obtained from the angle formed by lines Pn−1 Pn and Pn Pn+1; the distance between the curve starting point Lsn (the intersection point of the line Pn−1 Pn and the perpendicular from the curve center On to the line Pn−1 Pn) and the point Pn−1; and the distance Lssn from the vehicle's position to each representative node of the curve.

The error set value depends on the road width D and the shorter line distance judged by the long/short judgment 120d, thereby being represented as αh·D. (Here, αh is a constant to be set in accordance with the shorter line distance, hereinafter referred to as a node interval correction factor.)

Normally, a road width obtained from the road geometry detector 130 is to be adopted for the foregoing road width D, but, when the road geometry detector 130 cannot tell any road width, the foregoing road width D may be set based on the road type information to be obtained from the navigator 110. In this connection, the wider the road width D, the larger the error set value, thus going toward no correction. This means that, the wider the actual road width, the larger the radius of the curvature Rn.

The fact, that the interval of nodes is short means that the road is accurately defined by nodes on the map. In that case, corrections of the difference De1n is not significant.

Therefore, as with the node interval correction factor α, the shorter the line distance, the larger the node interval correction factor α, thus increasing the error set value to eliminate the chance for correction. For example, when the shorter line distance is shorter than 20 m, α=1.2, and when the shorter line distance is shorter than 100 m, α is taken as 0.6, and when the shorter line distance is longer than 100 m, α is taken as 0.3.

Figure 9:
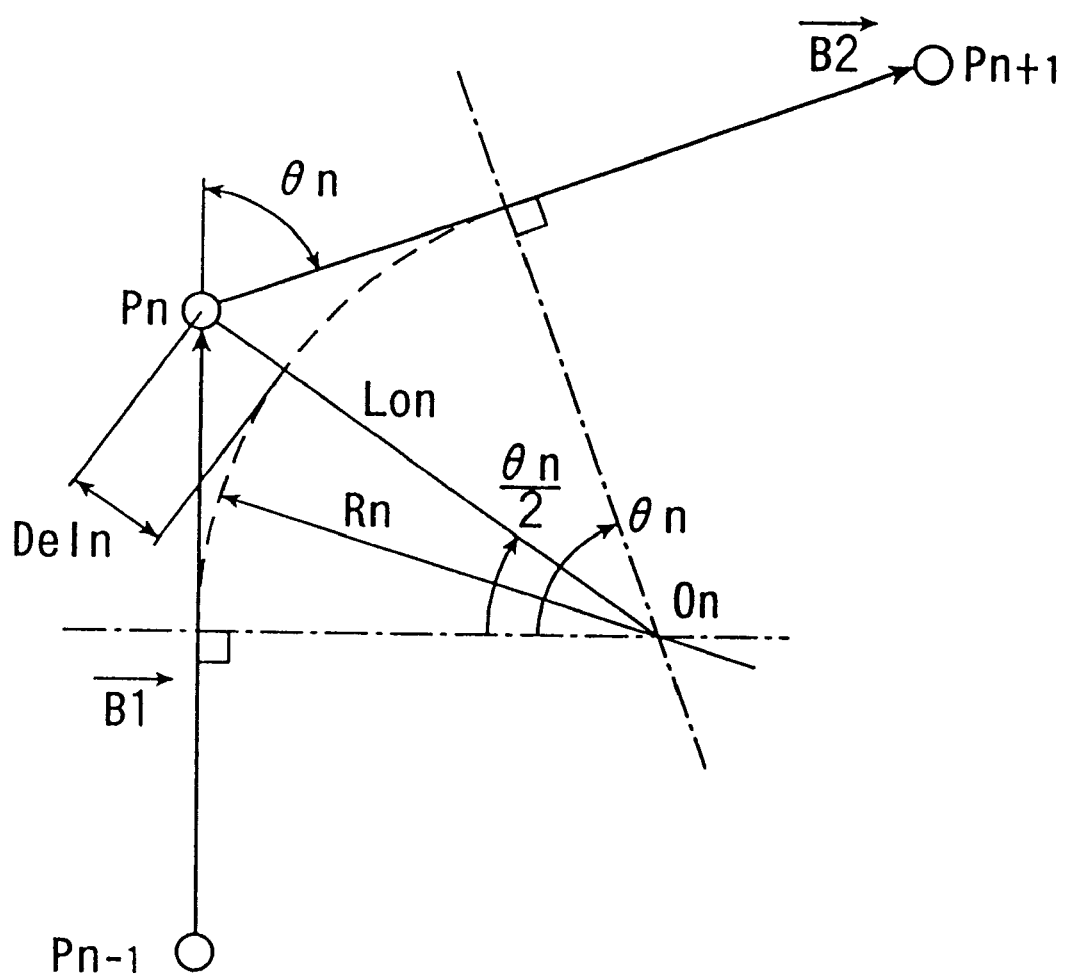
FIG. 9 is an illustration showing how to correct the obtained radius of curvature of the emerging curve.

FIG. 9 shows a detailed correction to be made by the corrector 120h. The vector from Pn−1 to Pn is denoted as $\vec{B1}$, and the vector from n to n+1 is denoted as $\vec{B2}$.

$$\vec{B1}=(Xn-Xn-1, Yn-Yn-1)=(Xb1, Yb1)$$

$$\vec{B2}=(Xn+1-Xn, Yn+1-Yn)=(Xb2, Yb2)$$

An angle formed by $\vec{B1}$ and $\vec{B2}$ is as follows:

$$\cos \theta n=(Xb1 \cdot Xb2+b1+Yb2)/(|\vec{B1}| \cdot |\vec{B2}|)$$

The error (ratio) Pde1n between Lon and Rn is as follows:

$$Pde1n=Rn/Lon=\cos(\theta n/2)=((\cos \theta n+1)/2)^{1/2} \qquad (25)$$

Therefore, the difference De1n is as follows:

$$De1n=Lon-|Rn|=Lon \cdot (1-Pde1n)=Lon \cdot (1-(\cos \theta n+1)/2)^{1/2}) \qquad (26)$$

In this connection, when the difference De1n is larger than the error set value (α·D), correction is made so that De1n equals αh·D for the radius of curvature Rn. In detail, $$Lon = De\ln/(1 - ((\cos\theta n + 1)/2)^{1/2}) \qquad (27)$$

$$= \alpha h \cdot D / (1 - ((\cos\theta n + 1)/2)^{1/2})$$

$$= \alpha h \cdot D / \left(1 - \left((Xb1 \cdot Xb2 + Yb1 \cdot Yb2 + |\vec{B1}| \cdot |\vec{B2}|)/\left(2 \cdot |\vec{B1}| \cdot |\vec{B2}|\right)\right)^{1/2}\right)$$

$$Rn = Lon \cdot Pde\ln = \alpha h \cdot D / (1 - ((\cos\theta n + 1)/2)^{1/2}) \cdot ((\cos\theta n +)/2)^{1/2}$$

$$= \alpha h \cdot D / ((2/(\cos\theta n + 1))^{1/2} - 1)$$

$$= \alpha h \cdot D / \left(\left(2|\vec{B1}| \cdot |\vec{B2}| / (Xb1 \cdot Xb2 + Yb1 \cdot Yb2 + (|\vec{B1}| \cdot |\vec{B2}|)\right)\right)^{1/2} - 1\right)$$

As described, since curve information is obtained from the curve geometry calculator 120, the irregular nodes from the navigator 110 can be used as they are, thus resulting in simple calculation without data supplement or complex calculations, so that the radius of curvature of a road being traveled can be determined quickly and accurately.

Further, in this case, since the continuity of respective curve detection nodes for determining the radius of curvature is natural or smooth, data accurately representing an actual road geometry can be obtained.

Furthermore, even if possible calculation errors appear, the calculated radius of curvature always becomes smaller than the actual radius of curvature, thereby preferable to set off a proper warning in the warning/detection control when approaching a curve.

Provision of the corrector 120h for the radius of curvature can help provide an accurate calculation of the radius of curvature. Furthermore, the error set value which is variable in accordance with the actual road geometry and the number of nodes can make calculations more accurate. In other words, since the wider road actually represents the larger radius of curvature, the wider the road width, the larger the error set value, thus eliminating the need or chance for correction. Furthermore, a shorter straight line distance results in fine setting of nodes, thus probably representing the road more accurately, so that the shorter the shorter line distance, the larger the error set value, thereby the more eliminating the chance for correction.

The data reduction section 120i is provided to reduce data corrected by the corrector 120h for every node, eliminating unnecessary calculations.

The data reduction section 120i assumes the following four cases to reduce the voluminous curve information to only really needed ones.

Figure 10A:
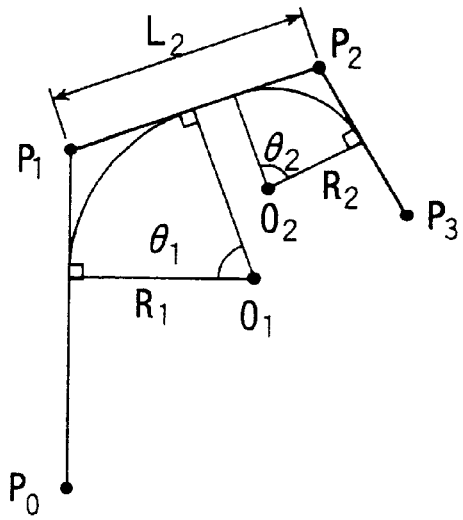
FIG. 10(a) is an illustration showing the case for the operation of data reduction for a sharp curve with marginal deceleration distance.

CASE 1 - - - Sharp curve, but there is a marginal deceleration distance (=Rn−1−Rn) before reaching node Pn from node Pn−1 (FIG. 10(a))

If $|Rn-1|>|Rn|, Rn-1 \cdot Rn>0$ and $Ln>|Rn-1|-|Rn|$ then the curve information for each of the nodes Pn−1 and Pn is necessary. Because there is a marginal distance for deceleration before the vehicle reaches node Pn from node Pn−1, independent control may be necessary for both nodes.

Considering that node Pn−1 and node Pn both represent the same curve, a total curve angle θs (n) at node Pn is considered to be equal to the sum of a total curve angle θs (n−1) at node Pn−1 and 2cos$^{-1}$ (Rn/Lon). Therefore, the total curve angle θs(n) at node Pn=the total curve angle θs (n−1) at node Pn−1+2 cos$^{-1}$(Rn/Lon).

Figure 10B:
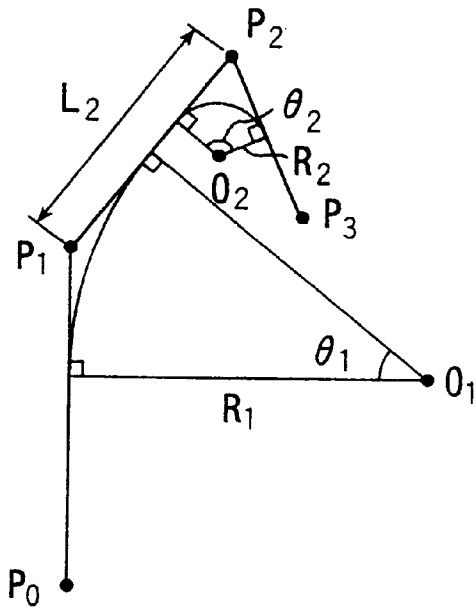
FIG. 10(b) is an illustration showing the case for the operation of data reduction for a sharp curve with no deceleration distance.

CASE 2 - - - A Sharp Curve, and there is no marginal deceleration distance(=Rn−1−Rn) before reaching node Pn from node Pn−1. (FIG. 10(b))

If $|Rn-1|>|Rn|, Rn-1 \cdot Rn>0$ and $Ln<|Rn-1|-|Rn|$, then the curve information of node Pn−1 can be neglected. In other words, the execution of control for the node Pn curve can absorb the execution of control for the node Pn−1 curve, thus making the curve information of node Pn−1 useless (negligible), so that the total number of control executions to be made can be minimized.

Considering that node Pn−1 and node Pn both represent the same curve, a total curve angle θs (n) at node Pn is considered to be equal to the sum of a total curve angle θs (n−1) at node Pn−1 and 2cos$^{-1}$ (Rn/Lon). Therefore, the total curve angle θs(n) at node Pn=the total curve angle θs(n−1) at node Pn−1+2 cos$^{-1}$(Rn/Lon).

Figure 10C:
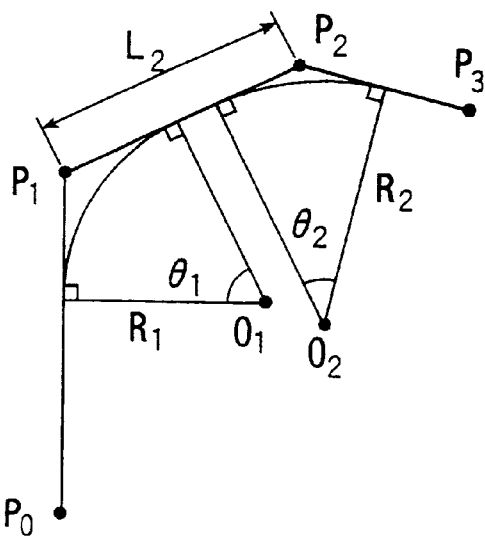
FIG. 10(c) is an illustration showing the case for the operation of data reduction for a mild curve.

CASE 3 - - - Mild curve (FIG. 10(c))

If $|Rn-1|<|Rn|, Rn-1 \cdot Rn>0$, then the curve information of node Pn can be neglected. In other words, since the vehicle is sufficiently decelerated by the node Pn−1, the curve information of the node Pn which represents a milder curve than that of the node Pn−1 is useless, thus being neglected. In this connection, in the case of a long Ln, full acceleration (if node Pn−1 and node Pn both can be regarded as independent curves) may boost the vehicle speed a great deal before the vehicle reaches node Pn, so that the curve information for node Pn may be maintained depending on the magnitude of Ln.

Considering that node Pn−1 and node Pn both represent the same curve, a total curve angle θs (n) at node Pn is considered to be equal to the sum of a total curve angle θs (n−1) at node Pn−1 and $2\cos^{-1}$ (Rn/Lon). Therefore, the total curve angle θs (n) at node Pn the total curve angle θs(n−1) at node $Pn-1+2\cos^{-1}(Rn/Lon)$ In this connection, if the curves at node Pn−1 and node Pn are regarded as independent from each other, the curve angle θn at the node Pn is not added, but a new addition calculation will be started (depending on the magnitude of Ln).

Figure 10D:
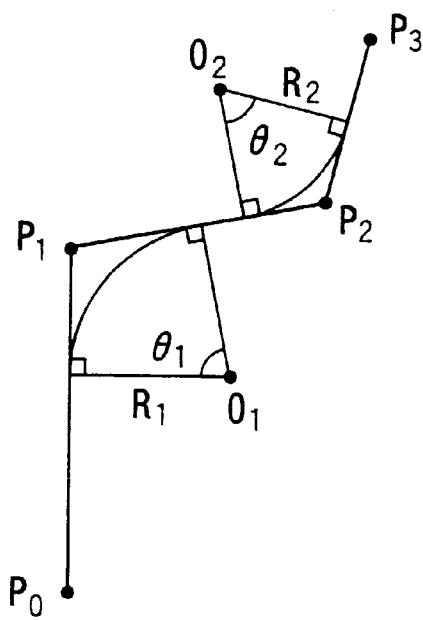
FIG. 10(d) is an illustration showing the case for the operation of data reduction for curves changing from right to left, or left to right.

CASE 4 - - - The turning directions of curves are changed from right to left or from left to right (FIG. 10(d)).

If $Rn-1 \cdot Rn < 0$ then, the curve information for node Pn is needed since the turning direction is considered to be different when the vehicle runs from node Pn−1 to node Pn.

The addition result of curve angles which continue up to node Pn−1 is defined as the total curve angle θs (n−1) up to node Pn−1.

Furthermore, node Pn can be a starting point to calculate a total curve angle θSn independent from the total curve angle θs (n−1).

The total curve angle angle θs (n) at node Pn=$2\cos^{-1}$(Rn/Lon)

In this calculation, the reason why the deceleration distance is defined as the difference between the radius of curvature Rn and the radius of curvature Rn−1 is as follows:

Theoretically the deceleration distance is expressed as follows:

Deceleration distance = $(Vp(n-1)^2 - Vpn^2)/(2 \cdot a)$ $= (Rn-1\ ayl(n-1) - Rn\ ayln)/(2 \cdot a)$ $= (Rn-1-Rn) \cdot ayl/(2 \cdot a)$ where Vpn=reference allowable approaching speed at node Pn a=deceleration ayln=allowable lateral acceleration When the deceleration a is assumed to be 1/2ayl, then Deceleration distance=$Rn-1-Rn$ Such data reduced by the data reduction section 120i are entered to the vehicle movement control alterant 100 together with data before the reduction.

The vehicle movement control alterant 100 alters the characteristic of the vehicle movement controllers, receiving data from the navigator 110 and the curve geometry calculator 120, and alters control of the power distribution controller 60, the left/right wheel differential limiter controller 70 and the brake controller 80 by sending signals to respective controllers 60, 70 and 80 based on the positional relation between the vehicle and the curve on the road.

The following are explanations of how they work:

The power distribution controller 60 receives respective wheel speed signals from the front left wheel speed sensor 44fl, the front right wheel speed sensor 44fr, the rear left wheel speed sensor 44rl and the rear right wheel speed sensor 44rr, a signal representative of the throttle opening θth from the throttle opening sensor 45 and a signal representative of gear position from the gear position sensor 46, and then carries out control of the differential limiting force to be applied to the center differential 3, i.e., controls the transfer torque of the transfer clutch 21 in the normal control mode, the starting control mode, the steering control mode and the slip control mode, referring to the tabulated duty ratio map as shown in FIG. 4 by the throttle opening θth and vehicle speed V based on running conditions. Thus, for example, provided that the specified torque distribution is front 35/rear 65, the torque distribution varies according to the control from front 35/rear 65 to front 50/rear 50 which is the torque distribution at the direct coupling of the transfer clutch.

The left/right wheel differential limiter controller 70 receives respective wheel speed signals from the front left wheel speed sensor 44fl, the front right wheel speed sensor 44fr, the rear left wheel speed sensor 44rl and the rear right wheel speed sensor 44rr, a signal representative of the throttle opening θth from the throttle opening sensor 45, a signal representative of the gear position from the gear position sensor 46, a signal representative of the steering wheel angle θf from the steering wheel sensor 47 and a signal representative of the longitudinal acceleration Gx from the longitudinal acceleration sensor 50, and then carries out control of the limiting differential of the rear left and right wheels by controlling the hydraulic multi-plate clutch 33 of the rear differential 7 according to running conditions.

As mentioned before, slip conditions of the rear wheels are judged and if it is judged as slipping, the hydraulic pressure applied to the clutch is set for slip conditions based on the steering wheel angle θf by referring to a data map predetermined by experiments and theoretical calculations.

If it is judged as non-slipping, the hydraulic pressure applied to the clutch is set for non-slip conditions. The hydraulic pressure set for non-slip conditions is controlled based on the vehicle speed V, e.g., an average of the 4 wheel speeds, and the throttle opening θth by referring to a data map predetermined by experiments and theoretical calculations and characterized in having bigger values as the vehicle speed and load become higher, and is further controlled in a corrective way by the longitudinal acceleration and information that the gear position is lower than specified.

The brake controller 80 receives respective wheel speed signals from the front left wheel speed sensor 44fl, the front right wheel speed sensor 44fr, the rear left wheel speed sensor 44rl and the rear right wheel speed sensor 44rr, a signal representative of the steering wheel angle θf from the steering wheel sensor 47, a signal representative of the real yaw rate γ from the yaw rate sensor 48, and a signal representative of the lateral acceleration Gy from the lateral acceleration sensor 49 (for the case of correction being done by the yaw rate deflection correcting value Δγ' corresponding to the side slip angle α and then calculate the aimed braking force BFf and BFr for correcting the over steering or under steering characteristic of the vehicle based on the following values calculated thereby;

Sγ': differential of the aimed yaw rate γ'

Sγ'Low: differential of the aimed yaw rate for a low friction road γ'Low dΔγ: deflection of Sγ' and Sγ'Low Δγ: Deflection of the real yaw rate γ and the aimed yaw rate γ'

These aimed braking forces may be corrected by using the yaw rate deflection correcting value $\Delta\gamma'$ corresponding to the side slip angle $\alpha$.

The brake controller 80 selects the rear inside wheel for correcting an under steering characteristic while turning, or the front outside wheel for correcting an over steering characteristic while turning, and sends a control signal to the brake actuator 25 so that the aimed braking force is applied to the selected wheel. This is carried out, while comparing the yaw rate deflection $\Delta\gamma$ with the threshold $\epsilon\Delta$, when the yaw rate deflection $\Delta\gamma$ comes from inside of the insensitivity band to the outside, i.e., to the control area.

The navigator 110 combines vehicle running data and map data while operating map matching and sends its results to the display 110c based on an operating signal for displaying the current position of the vehicle, the map showing the area, the optimum route to the destination and so on, and also sends its results to the vehicle movement control alterant 100 and the curve geometry calculator 120 as necessary.

The road geometry detector 130 generates 3D-images showing distances, based on the images taken by the pair of CCD cameras 130a, recognizes the road to be traveled by carrying out a histogram processing about distance distributions of the 3D-images, calculates the road width, and then sends it to the curve geometry calculator 120 as necessary.

The curve geometry calculator 120 detects three nodes, i.e., the first node, second node and the third node, in the traveling direction from the vehicle on and judges short/long, distances of two straight lines, one starting from the first node and ending at the second node, the other from the second node to the third node.

Then a mid point is set on the short line by calculating the half distance of the short line and a mid-point-same-distance point is set on the long line at the half distance of the short line from the second node.

Then two other straight lines are drawn so that one passes through the mid point and crosses the short line at a right angle and the other passes through the mid-point-same-distance point and crosses the long line at a right angle. The point at which these two lines intersect each other is determined as the center of the curve and a radius of the curve is calculated therefrom. Thus the curve data are obtained, further corrected based on the road width data from the road geometry detector 130, reduced in a predetermined manner and sent to the vehicle movement control alterant 100.

Figure 11:
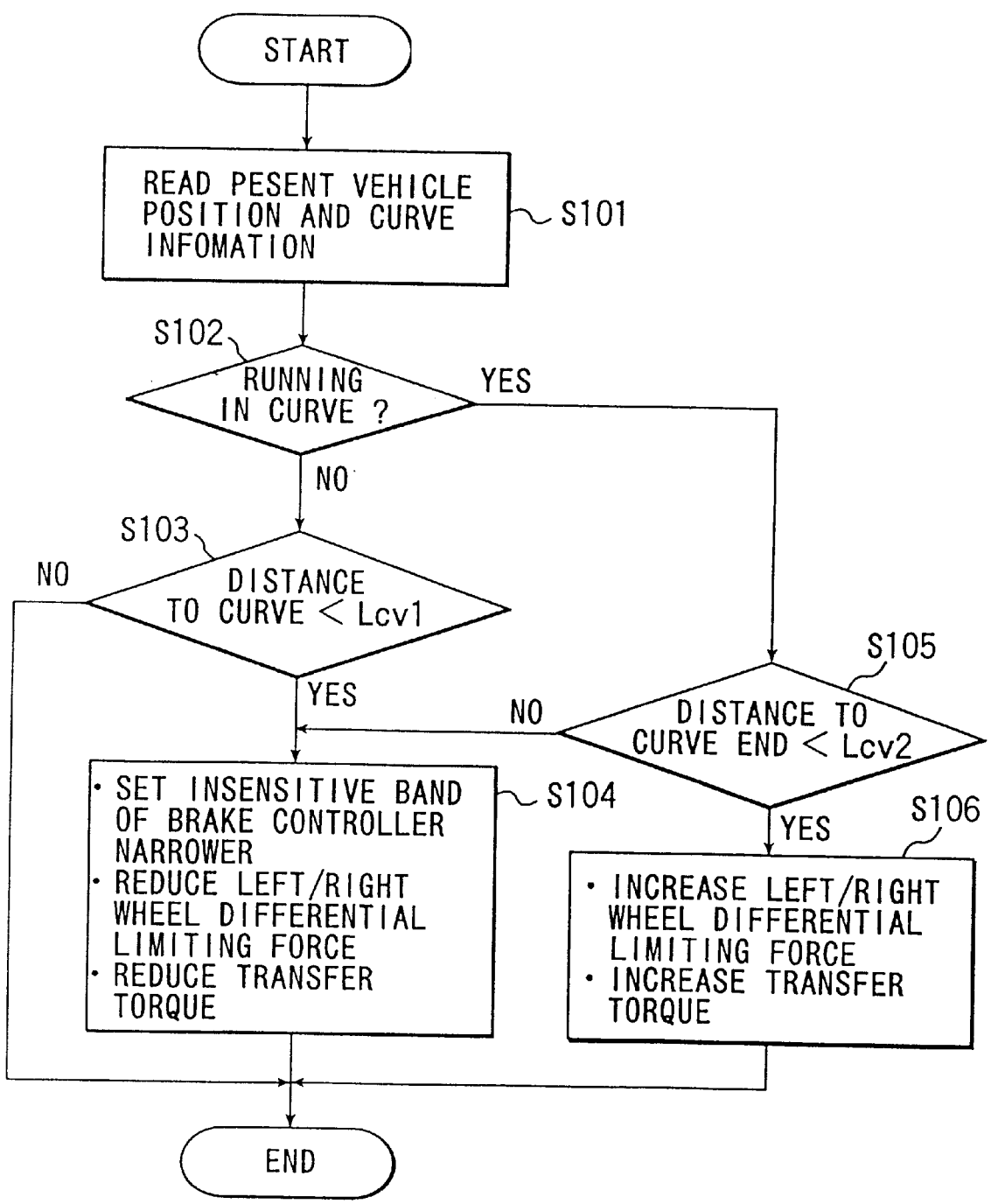
FIG. 11 is a flow chart showing control of a vehicle movement control alterant.

The vehicle movement control alterant 100 carries out controls according to the flow chart as shown in the FIG. 11.

At S101 (S means step), position data and curve data on the road to be traveled are read from the navigator 110 and the curve geometry calculator 120 respectively.

At next S102, judgement is made if the vehicle is running in the curve or not. The curve data are compared with predetermined conditions, e.g., for road width, vehicle speed, radius of curvature. If the radius of curvature of the curve data is smaller than that of the predetermined conditions corresponding to the road width and vehicle speed, it is judged that the vehicle is running in a curve.

If the vehicle is not in a curve, then S103 is taken, where it is judged if the distance to the curve entrance is less than Lcv1, which is predeterminedly given according to variables of, for example, road width, vehicle speed and radius of curvature of curve to be traveled.

If the distance is not less than Lcv1, the program goes to an end.

If the distance is less than Lcv1, S104 is taken, where the following signals are sent to the related controllers respectively; a signal making the insensitivity band narrower to the brake controller 80, a signal making the differential limiting force lower (i.e., weakening the pressure to be applied to the hydraulic multi-plate clutch 33 of the rear differential 7) to the left/right wheel differential limiter controller 70, and a signal reducing the transfer torque (i.e., resuming torque distribution by the center differential to the specified level) to the power distribution controller 60. Then the program goes to an end.

When it is judged that the vehicle is in a curve at S102, S105 is taken, where it is judged if the distance to the curve end is less than Lcv2, which is predeterminedly given according to variables of, for example, road width, vehicle speed and radius of curvature of curve to be traveled.

In the case the distance is not less than Lcv2, S104 is taken, where the following signals are sent to the related controllers respectively; a signal to the brake controller 80 making the insensitivity band narrower, a signal to the left/right wheel differential limiter controller 70 making the differential limiting force smaller (i.e., weakening the pressure to be applied to the hydraulic multi-plate clutch 33 of the rear differential 7), and a signal to the power distribution controller 60 reducing the transfer torque (i.e., resuming torque distribution by the center differential to the specified). Then the program goes to an end.

If the distance is less than Lcv2 at S105, S106 is taken, where the following signals are sent to the related controllers respectively; a signal to the left/right differential limiter controller 70 making the differential limiting force bigger (i.e. strengthening the pressure to be applied to the hydraulic multi-plate clutch 33 of the rear differential 7) and a signal to the power distribution controller 60 increasing the transfer torque (i.e., making the torque distribution by the center differential more equal for front and rear).

In other words, when the vehicle is not in the curve and the distance to the curve is less than the predetermined distance Lcv1, the following controls are carried out, preparing for a turn at the curve;

The brake controller 80 makes the insensitivity band narrower, increasing sensitivity so that steering responsiveness is improved.

The left/right differential limiter controller 70 reduces the differential limiting force so that turning performance of the vehicle becomes better.

The power distribution controller 60 reduces the transfer torque so that turning performance of the vehicle becomes better.

When the vehicle has reached the area within Lcv2 to the curve end, the following controls are carried out, preparing for stable transition from a curved road to a straight road without having an abnormal feeling;

The left/right differential limiter controller 70 increases the differential limiting force so that running stability is improved.

The power distribution controller 60 increases the transfer torque so that running stability is improved.

Thus, according to the preferred embodiment of the present invention, a curve to be traveled is detected beforehand and characteristics of the respective vehicle movement controllers are altered and activated so that driving through the curve including entering in and going out of the curve, can be done appropriately.

Though the explanation of the preferred embodiment is made regarding the vehicle equipped with three vehicle movement controllers, i.e., the power distribution controller, the left/right wheel differential limiter controller and the brake controller, this is applicable to a vehicle having at least one of the three controllers.

Though the explanation of the left/right wheel differential limiter controller is made regarding the vehicle which equips it for rear wheels, it is applicable to a vehicle which equips the controller for the front wheels.

Though the explanation of the power distribution controller is made regarding the specification for distributing more torque to the rear wheels, it is applicable to a specification for distributing more torque to the front wheels.

Though the explanation is made regarding on the center differential and the rear differential which are both compound type planetary gear, it is applicable to those of a bevel gear type or a planetary gear type having a ring gear.

Though the embodiment shows the case where the characteristic of the brake controller is changed by setting the insensitivity band, i.e., the threshold of yaw rate deflection, to be narrower, a similar effect can be obtained, for example as shown in FIG. 5, by narrowly setting an insensitivity band of the side slip angle, in the case yaw rate deflection is corrected according to side slip.

Controlling of the braking force by the brake controller may be of other types than shown in the preferred embodiment.

Thus the vehicle dynamic control system, according to the present invention, alters characteristics of respective vehicle movement controllers, recognizing beforehand details of a curved road to be traveled, so that the controllers of the system can function properly for coming and foreseeable running conditions and current running conditions, and driving through a curve can be done appropriately, including entering in and going out of the curve.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A dynamic control system for a vehicle, comprising:
   a navigation means comprising a vehicle position detector, an auxiliary memory and a processing unit for outputting a positional signal;
   a curve geometry calculating means responsive to said positional signal for outputting a curve informational signal;
   a vehicle dynamic control means responsive to said curve informational signal for controlling the vehicle turning movement and producing a dynamic control signal to improve the vehicle running stability to a posture that is favorable to turning along an emerging curve in accord with the calculated curve geometry; and
   a characteristic changing means responsive to the dynamic control signal for changing a controlling characteristic of the vehicle dynamic control means to favor turning along the emerging curve when the vehicle is within a predetermined distance from the curve.

2. The dynamic control system according to claim 1, wherein the characteristic changing means includes a means for increasing sensitivity to steering responsiveness of the dynamic control means.

3. The dynamic control system according to claim 2, wherein the vehicle dynamic control means includes a brake controlling means for calculating a braking force to be applied to a wheel selected on which to apply said braking force in order to correct a steering deviation of the vehicle based on a yaw rate applied to the vehicle,
   said brake controlling means includes:
      an actual yaw rate detecting means for detecting an actual yaw rate;
      a target yaw rate calculating means for calculating a target yaw rate based on said vehicle running condition including a vehicle speed and, steering angle;
      a yaw rate deviation calculating means for calculating a yaw rate deviation of said actual yaw rate and said target yaw rate;
      a yaw rate deviation correcting means for calculating corrected yaw rate deviation by correcting said yaw rate deviation based on a vehicle side slip angle;
      a target braking force calculating means for calculating target braking force based on the actual yaw rate and the yaw rate deviation; and
      a braking wheel determining means for determining a braking wheel by the sign of the deviation of the yaw rate deviation from a threshold value,
   said changing means narrows an insensitivity band of the vehicle side slip for correcting the yaw rate deviation.

4. The dynamic control system according to claim 1, wherein the vehicle dynamic control means includes a brake controlling means for calculating a braking force to be applied to a wheel selected on which to apply said braking force in order to correct a steering deviation of the vehicle based on a yaw rate applied to the vehicle.

5. The dynamic control system according to claim 1, wherein the vehicle dynamic control means includes a brake controlling means for calculating a braking force to be applied to a wheel selected on which to apply said braking force in order to correct a steering deviation of the vehicle based on a yaw rate applied to the vehicle,
   said brake controlling means includes:
      an actual yaw rate detecting means for detecting an actual yaw rate;
      a target yaw rate calculating means for calculating a target yaw rate;
      a yaw rate deviation calculating means for calculating a yaw rate deviation of the actual yaw rate from the target yaw rate;
      a target braking force calculating means for calculating target braking force based on the actual yaw rate and the yaw rate deviation; and
      a braking wheel determining means for determining a wheel on which to apply braking force based upon the yaw rate deviation and a threshold value,
   wherein the characteristic changing means narrows the yaw rate deviation from the threshold value.

6. The dynamic control system according to claim 5, wherein the vehicle dynamic characteristic changing means includes means for reducing the differential limiting force of the wheel differential controlling means so as to improve turning performance.

7. The dynamic control system according to claim 1, wherein the vehicle dynamic control means includes wheel differential controlling means for controlling the differential limiting force between a left and right wheel.

8. The dynamic control system according to claim 7, wherein the vehicle dynamic characteristic changing means includes means for reducing the differential limiting force of the power distributing means so as to improve turning performance.

9. The dynamic control system according to claim 1, wherein the vehicle dynamic control means includes a power distributing means for controlling the differential limiting force between front and rear wheels to distribute the driving force to the front and rear wheels.

10. The dynamic control system according to claim 1, wherein the curve geometry calculating means includes a road width detector for detecting a road width based on a stereo-image outside of said vehicle, and corrects for the road geometry detected by the navigation means for the road width so as to obtain a more accurate current position of the vehicle.

11. The dynamic control system according to claim 1, wherein the characteristic changing means changes the controlling characteristic of the dynamic control means to favorably stabilize the vehicle attitude when the vehicle exits the curve for transition from curved road to straight road.

12. A method of using a dynamic control system of a vehicle having a dynamic control device, comprising:

detecting running conditions of the vehicle;

detecting a current position of the vehicle and a curve;

calculating a first distance between the curve and the current position; and changing a controlling characteristic of the dynamic control device to favorably enter the curve when the first distance is less than a predetermined distance.

13. The method according to claim 12, further comprising:

calculating a second distance between the curve end and the current position; and changing a controlling characteristic of the dynamic control device to favorably stabilize a vehicle's attitude to transition from a curved road to a straight road when the second distance is less than a predetermined distance.

14. The method according to claim 12, wherein the changed control characteristic is accomplished by increasing sensitivity to the steering responsiveness of the dynamic control means based on the running conditions.

15. The method according to claim 12, wherein the changed control characteristic is accomplished by reducing a differential limit force of the dynamic control means.

* * * * *